United States Patent
Krukowski et al.

(10) Patent No.: US 12,473,248 B2
(45) Date of Patent: Nov. 18, 2025

(54) METHOD AND INTERMEDIATE COMPOUNDS FOR THE PREPARATION OF MENAQUINONE MK-7

(71) Applicant: Vitasynth Sp. z.o.o., Warsaw (PL)

(72) Inventors: Andrzej Krukowski, Warsaw (PL); Konrad Zielinski, Zduny (PL)

(73) Assignee: VITASYNTH SP. Z.O.O, Warsaw (PL)

( * ) Notice: Subject to any disclaimer, the term of this patent is extended or adjusted under 35 U.S.C. 154(b) by 456 days.

(21) Appl. No.: 18/005,250

(22) PCT Filed: Jul. 16, 2021

(86) PCT No.: PCT/PL2021/050055
§ 371 (c)(1),
(2) Date: Jan. 12, 2023

(87) PCT Pub. No.: WO2022/015181
PCT Pub. Date: Jan. 20, 2022

(65) Prior Publication Data
US 2023/0250041 A1    Aug. 10, 2023

(30) Foreign Application Priority Data
Jul. 16, 2020   (PL) ..................................... P434705

(51) Int. Cl.
*C07C 46/02*    (2006.01)
*C07C 43/315*   (2006.01)

(52) U.S. Cl.
CPC ............ *C07C 46/02* (2013.01); *C07C 43/315* (2013.01)

(58) Field of Classification Search
CPC ......... C07C 46/02; C07C 50/14; C07C 41/18; C07C 43/285
USPC ......................................................... 568/309
See application file for complete search history.

(56) References Cited

FOREIGN PATENT DOCUMENTS

| WO | 20100335000 A1 | 4/2010 |
|---|---|---|
| WO | 2014058330 A2 | 4/2014 |
| WO | 2016060670 A1 | 4/2016 |
| WO | 2019194690 A1 | 10/2019 |

OTHER PUBLICATIONS

Min et al., The Friedel—Crafts Allylation of a Prenyl Group Stabilized by a Sulfone Moiety: Expeditious Syntheses of Ubiquinones and Menaquinones, J Org Chem., vol. 68, No. 20, 2003, pp. 7925-7927.
T. Wirth et al.: "Organoselenium Chemistry, Modern Developments in Organic Synthesis", 2000, Springer.

*Primary Examiner* — Ana Z Muresan
(74) *Attorney, Agent, or Firm* — Renner Kenner Greive Bobak Taylor & Weber Co., LPA

(57) ABSTRACT

The invention relates to a method and intermediate compounds for the preparation of menaquinone MK-7. The method for the preparation of menaquinone MK-7 is characterized in that, it comprises coupling of a compound of formula (11) with a compound of formula (17) in the presence of a base, to obtain a compound of formula (18), which is subjected to desulfonylation reaction in the presence of a palladium catalyst, to obtain a compound of formula (19), which is subjected to oxidation reaction, to obtain menaquinone MK-7. The invention also relates to compound (8), preferably in a crystalline form, which is a convenient intermediate compound for the preparation of menaquinone MK-7.

15 Claims, 1 Drawing Sheet

METHOD AND INTERMEDIATE COMPOUNDS FOR THE PREPARATION OF MENAQUINONE MK-7

FIELD OF INVENTION

The invention relates to a method and intermediate compounds for the preparation of menaquinone MK-7, also known as vitamin K2.

SCOPE OF PRIOR ART

Menaquinones are derivatives of 1,4-naphtoquinone, which in position 2 contains a methyl group, and in position 3 a chain consisting of variable number of isoprene groups.

Menaquinones are often defined by the abbreviation "MK-n", where n indicates a number of unsaturated isoprene groups at C3 carbon. Menaquinones MK-4 and MK-7 show biological activity towards a protective effect on bone density and are known under a common name—vitamin K2. MK-7 shows better bioavailability than MK-4, but in contrast to the latter, it is not produced in human cells. MK-7 as an ingredient of dietary supplements is obtained as a product of biosynthetic processes such as e.g., fermentation of soybeans, as well as a product of chemical synthesis processes in multi-kilogram scale.

In multistep syntheses of MK-7 a step of coupling a menadiol derivative with an isoprene chain plays a key role. A measure of the success of this transformation is simultaneous achievement of several goals: the product should be of high isomeric purity of isomer E; the reaction should be of high yield possible; raw material and catalysts of the reaction should be cheap, easily available and chemically pure; the reaction should be performed in conditions that does not require special regime being e.g., anhydrous conditions. The final requirement needed for the reaction to be performed on an industrial scale is an ease of purification of the product.

At the moment, there are no publications known, which gives a pure product after the coupling step without tedious, on an industrial scale, column chromatography. Additionally, in most cases chromatography does not allow to separate fractions of undesired geometric isomers. Min et al. in J Org Chem. 2003; 68(20): 7925-7927, discloses a method for the preparation of menaquinones, where 1,4-dimethoxy-2-methylnaphthalene is reacted with (E)-4-hydroxy-2-methyl-1-phenylsulfonyl-2-butene in Friedel-Crafts reaction, in the presence of various Lewis acids. Most of the reaction products are formed as a E/Z mixture of isomers in a ratio from 3:1 to a maximum of 10:1. The yields of most reactions are moderate, isolation of the products requires column chromatography, as well as no isolation of any product in a crystal form is mentioned.

WO/2010/035000 A1 discloses a synthesis strategy of MK-7 and other menaquinones using e.g., Kumada chemical reaction to combine an isoprene chain with a menadiol protected with an alkyl group. Troublesome conditions of combing organomagnesium derivatives of menadiol with isoprene chain were used in the synthesis, in the presence of a catalyst of the group of rare earth metals. In the 2+5 variant of the synthesis (the numbers correspond to the number of isoprene groups in compounds to be coupled), purification of the product of coupling reaction requires a chromatography at this step, or in the next step of oxidation of terminal isoprene group in allyl position. After the chromatography, the product in a form of an oil was obtained with low yield and of unspecified isomeric purity. In further steps, Biellmann reaction was used as a standard, by coupling a bromide with previously prepared sulfone. It should be mentioned here, that penta- and heptaprenols used in the patent document, do no have easily available natural sources and they are usually a product of multistep coupling of commonly available two- and threeisoprene alcohols.

WO/2014/058330 A2 discloses a method of preparation of MK-7 (1+3+3), where Friedel-Crafts reaction is used to incorporate a first isoprene unit to a menadiol protected with an ethyl group. After prior separation of the reaction mixture by column chromatography, a crystalline derivative was obtained with low yield. In further construction of the isoprene chain Biellmann reaction was used, coupling isoprene chain constructed from farnesol. It should be noted that, the oxidation reaction of terminal allyl position of farnesol used in the process is a low regioselectivity reaction, generating large amounts of constitutional isomers and side products, forcing to use a tedious purification of the product using chromatography.

WO/2019/191690 A1 discloses a method of preparation of MK-7, where allyl group is used to protect menadiol. The key step of ring alkylation requires use of equimolar amounts of Lewis acid. In order to purify the product, it is necessary to use chromatography, and the product is an oil with unspecified isomeric purity. For the construction of isoprene chain geraniol and its oxidized derivatives were used (1+2+2+2), that results in a need of desulfonylation of as many as three sulfonyl groups in a process employing mercury amalgams.

To sum up, at the moment no examples of a synthesis of menaquinone MK-7 were found, where alkylation of menadiol ring would take place with high yields in early synthetic steps using cheap and easily available reagents, and without the use of column chromatography in a process of semiproduct purification. Therefore, there is still a need to increase yield, and decrease total costs of the synthesis of MK-7.

SUMMARY

The aim of the present invention is to provide a new method for the preparation of MK-7, the method allowing to solve a problem of low total yield, and also where tedious chromatographic purification steps are minimized, while keeping high purity of the final compound.

Another aim of the present invention is to provide intermediate compounds useful for the preparation of MK-7, the intermediate compounds which can be easily prepared on an industrial scale.

The authors of the present invention found that it is possible to perform a step of coupling a menadiol derivative with an isoprene chain, with good yield using cheap and easily available raw materials.

The authors of the present invention obtained, as a result of coupling step, a new compound, which was unexpectedly obtained in a crystalline form, significantly improving scalability of the process and yield of the MK-7 synthesis.

According to the first aspect, the essence of the invention is to provide a method for the preparation of MK-7, i.e. a menaquinone of formula (20)

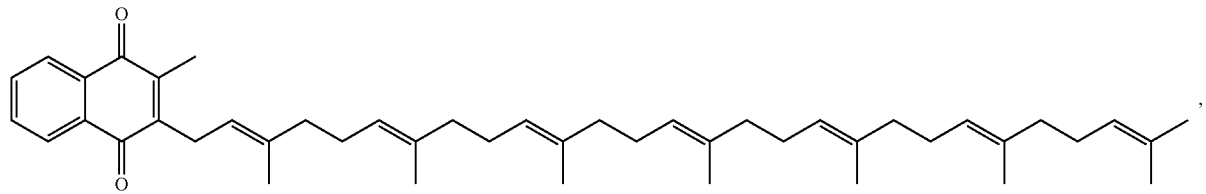
(20)
wherein the method is characterized in that, it comprises coupling a compound of formula (11)
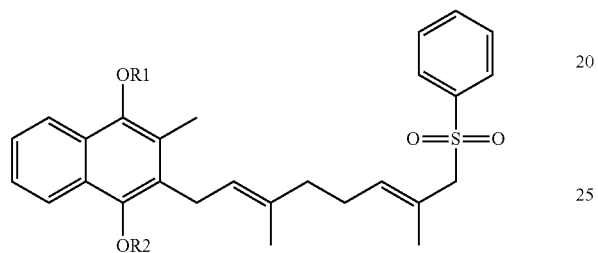
(11)
with a compound of formula (17)
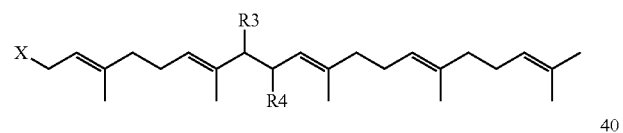
(17)
in the presence of a base, to obtain a compound of formula (18)
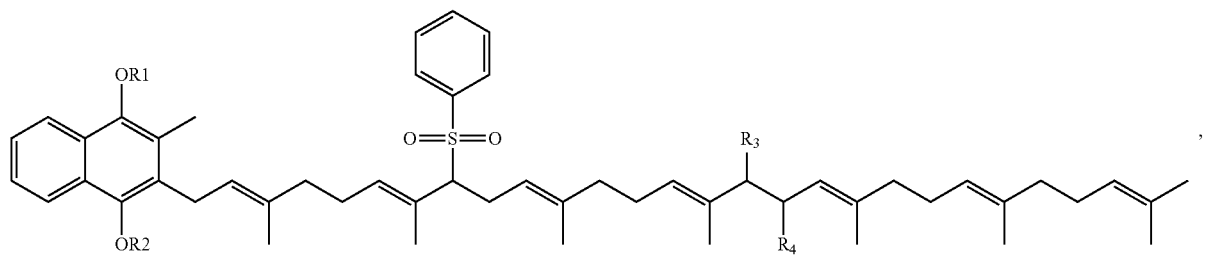
(18)

which is subjected to desulfonylation reaction in the presence of a palladium catalyst, to obtain a compound of formula (19)

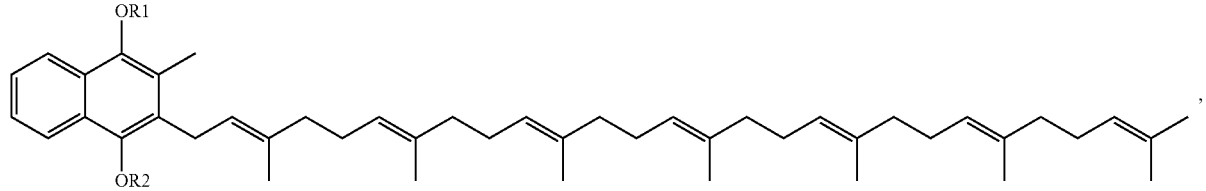

which is subjected to an oxidation reaction, to obtain the menaquinone of formula (20), wherein R1 and R2 are independently —$C_{1-6}$-alkyl, —$(CH_2)_n$—O—$C_{1-6}$-alkyl or benzyl, and wherein n is 1 or 2, wherein X is Br, Cl or I, wherein both R3 and R4 are hydrogen or one of R3 and R4 is hydrogen and the second is phenylsulfonyl group.

In a preferred embodiment of the invention, R1 and R2 are independently —$CH_3$, —$CH_2$—$CH_3$, —$CH_2$—O—$CH_3$, —$CH_2$—O—$CH_2$—$CH_3$, —$CH_2$—$CH_2$—O—$CH_3$, —$CH_2$—$CH_2$—O—$CH_2$—$CH_3$ or benzyl, X is Br, R3 is hydrogen, and R4 is phenylsulfonyl group.

In an embodiment of the invention, a reaction of coupling a compound of formula (11) with a compound of formula (17) is performed in tetrahydrofuran as an organic solvent, in the presence of sodium N,N-bis(trimethylsilyl)amide (NaHMDS) or lithium N,N-bis(trimethylsilyl)amide (LiHMDS) as a base, and at the temperature below 0° C., preferably at −30° C.

In an embodiment of the invention, a reaction of desulfonylation of a compound of formula (18) is performed in tetrahydrofuran, in the presence of Pd(dppe)Cl$_2$ as a palladium catalyst, using lithium triethylborohydride, at the temperature below 20° C., preferably at 0° C.

In an embodiment of the invention, a reaction of oxidation of a compound of formula (19) is performed using cerium ammonium nitrate. Preferably, a mixture of ethyl acetate and water is used as a solvent in said reaction.

In a preferred embodiment of the invention, compound (8) is used to obtain compound (11)

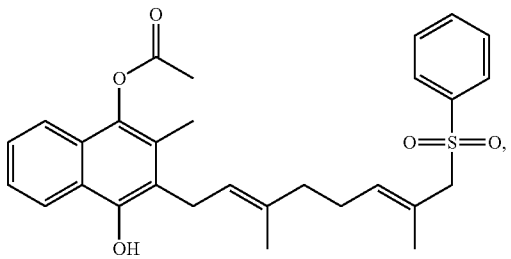

wherein compound (8) is obtained in Friedel-Crafts reaction of a compound of formula (3)

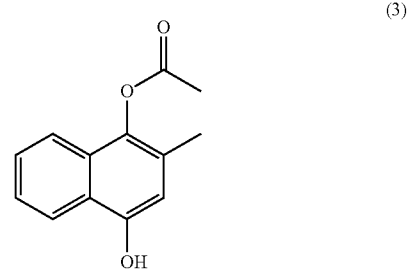 [SMILES: CC(=O)Oc1c(C)cc(O)c2ccccc12]

with a compound of formula (7)

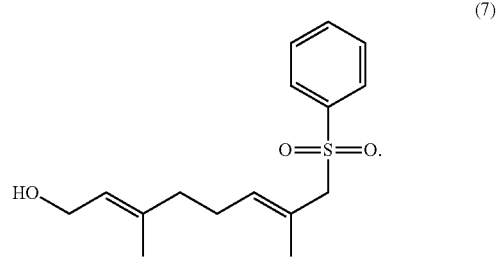 [SMILES: C/C(=C\CO)CC/C=C(\C)CS(=O)(=O)c1ccccc1]

In a preferred embodiment of the invention, said Friedel-Crafts reaction is performed in the presence of boron trifluoride etherate, in a solvent being a mixture of chloroform and toluene, at the temperature of 0° C., 5° C., 10° C., 15° C., 20° C., 25° C., 30° C., 35° C. or 40° C., preferably at the temperature from 20° C. to 30° C., most preferably at 25° C. Preferably, said Friedel-Crafts reaction is performed using 0.1, 0.2 or 0.3 equivalent of boron trifluoride etherate. Most preferably, said Friedel-Crafts reaction is performed using 0.3 equivalent of boron trifluoride etherate.

According to the second aspect, the invention provides a compound of formula (8)

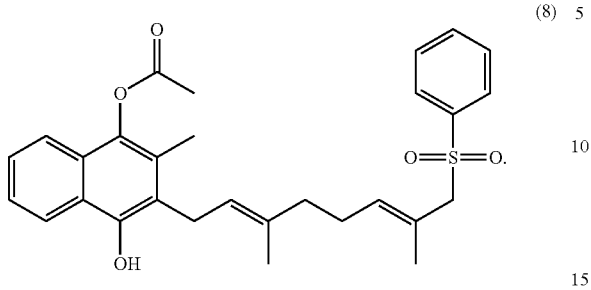

(8)

In an embodiment of the invention, compound (8) is a compound in a crystalline form, having characteristic peaks in X-ray powder diffraction (XRPD) spectrum recorded using X-ray Cu lamp, at the following 2-theta angles: 17.47, 18.18, 21.56±0.2°.

According to the third aspect, the invention provides a compound of formula (11)

(11)

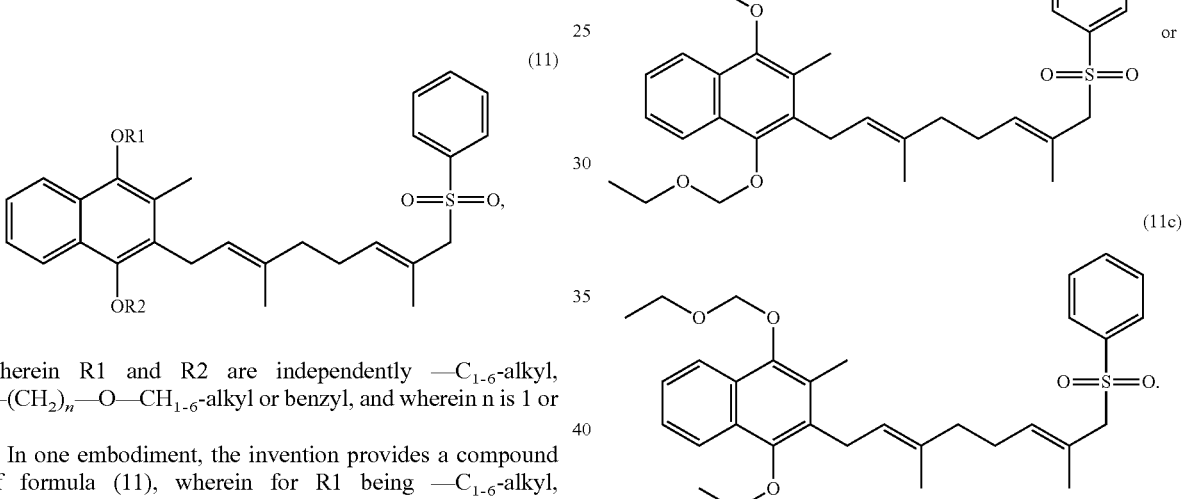

wherein R1 and R2 are independently —$C_{1-6}$-alkyl, —$(CH_2)_n$—O—$CH_{1-6}$-alkyl or benzyl, and wherein n is 1 or 2.

In one embodiment, the invention provides a compound of formula (11), wherein for R1 being —$C_{1-6}$-alkyl, —$(CH_2)_n$—O—$C_{1-6}$-alkyl or benzyl, R2 is —$(CH_2)_n$—O—$C_{1-6}$-alkyl, wherein for R2 being —$C_{1-6}$-allyl, —$(CH_2)_n$—O—$C_{1-6}$-alkyl or benzyl, R1 is —$(CH_2)_n$—O—$C_{1-6}$-alkyl, and wherein in any case n is 1 or 2.

In a preferred embodiment, the invention provides a compound of formula (11), which is selected from a group consisting of compounds of formula:

(11a)

(11b)

or (11c)

According to the fourth aspect, the present invention provides a compound of formula (19)

(19)

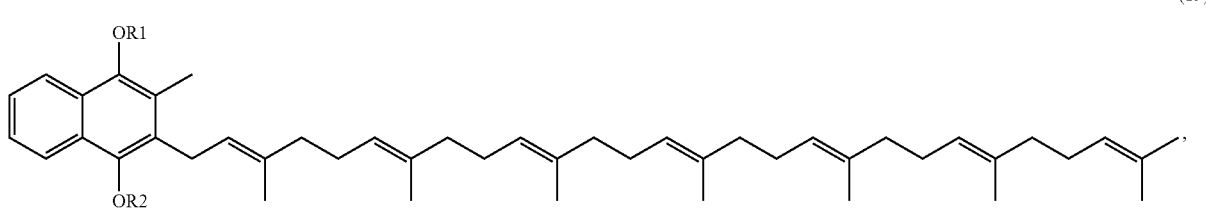

wherein R1 and R2 are independently —$C_{1-6}$-alkyl, —$(CH_2)_n$—O—$C_{1-6}$-alkyl or benzyl,
wherein n is 1 or 2,
wherein for R1 being —$C_{1-6}$-alkyl, —$(CH_2)_n$—O—$C_{1-6}$-alkyl or benzyl, R2 is —$(CH_2)_n$—O—$C_{1-6}$-alkyl,
wherein for R2 being —$C_{1-6}$-alkyl, —$(CH_2)_n$—O—$C_{1-6}$-alkyl or benzyl, R1 is —$(CH_2)_n$—O—$C_{1-6}$-alkyl.
In a preferred embodiment, a compound of formula (19) is selected from a group consisting of compounds of formula
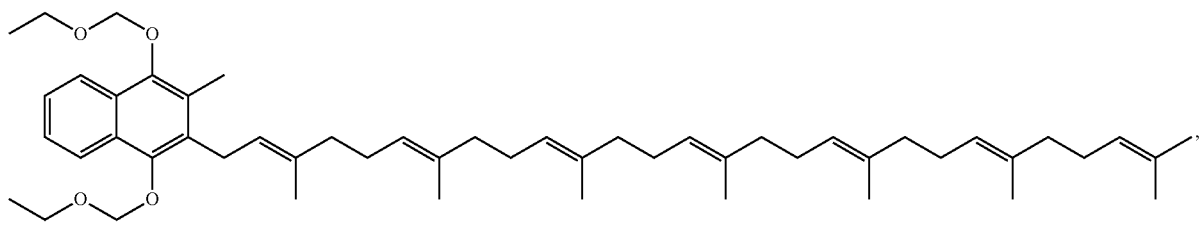
(19a)
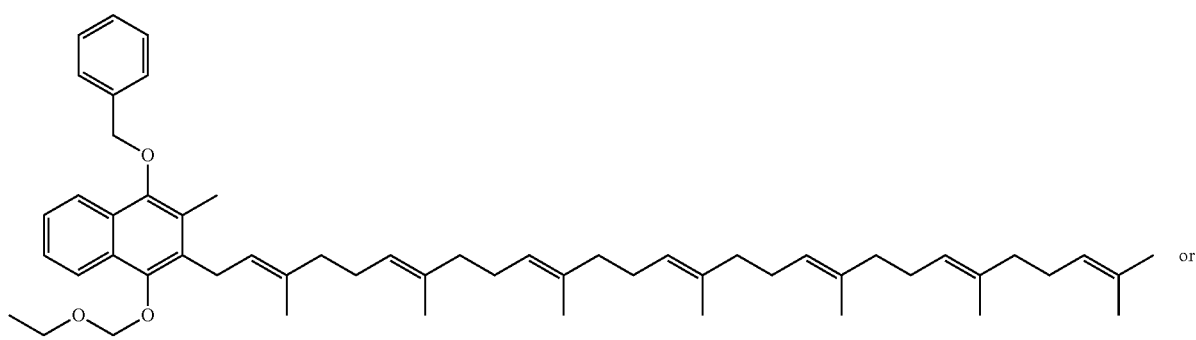
(19b)
or
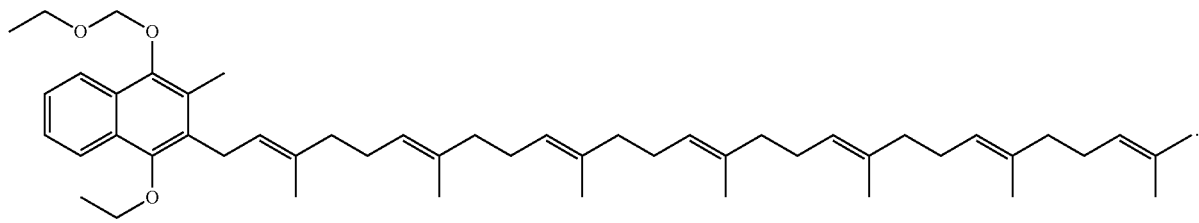
(19c)

BRIEF SUMMARY OF THE DRAWINGS

The subject of the invention is shown in an embodiment, wherein.

DETAILED DESCRIPTION

Figure 1:
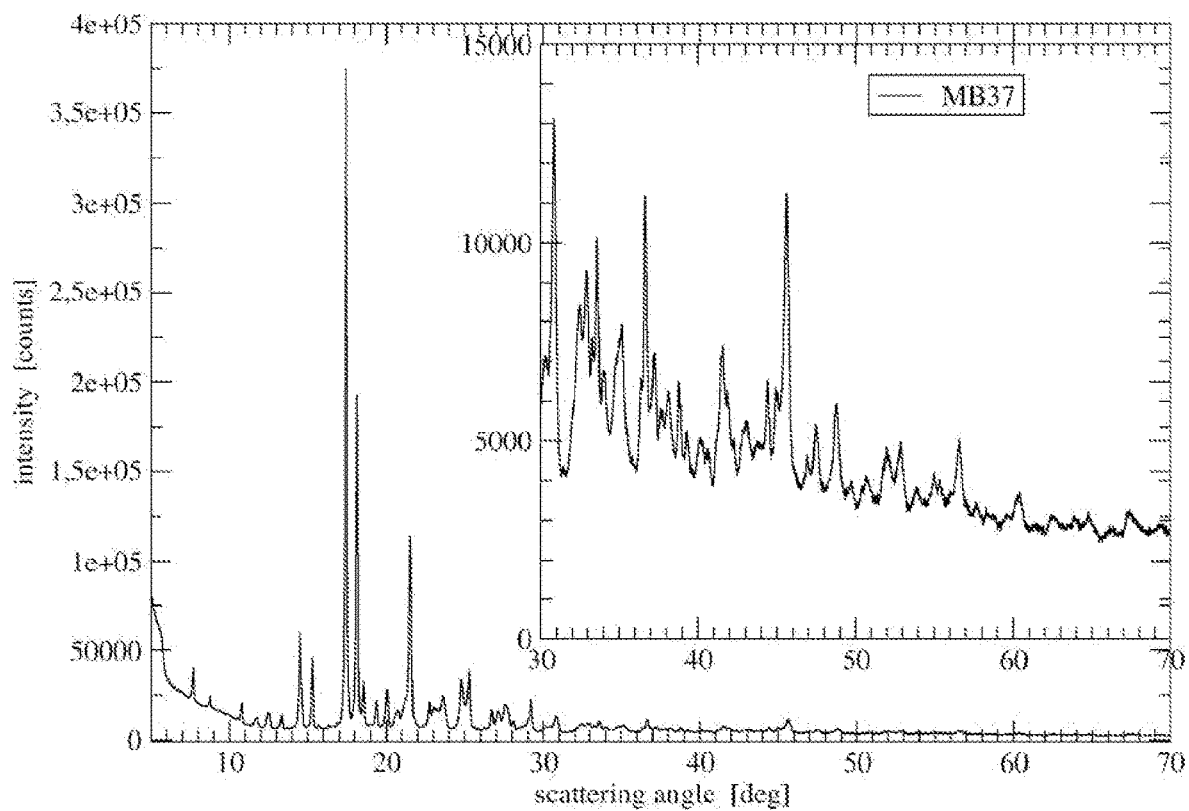
FIG. 1 shows XRPD pattern of a compound of formula (8) according to the invention.

Scheme I shows an embodiment of the method for the preparation of compound (8)

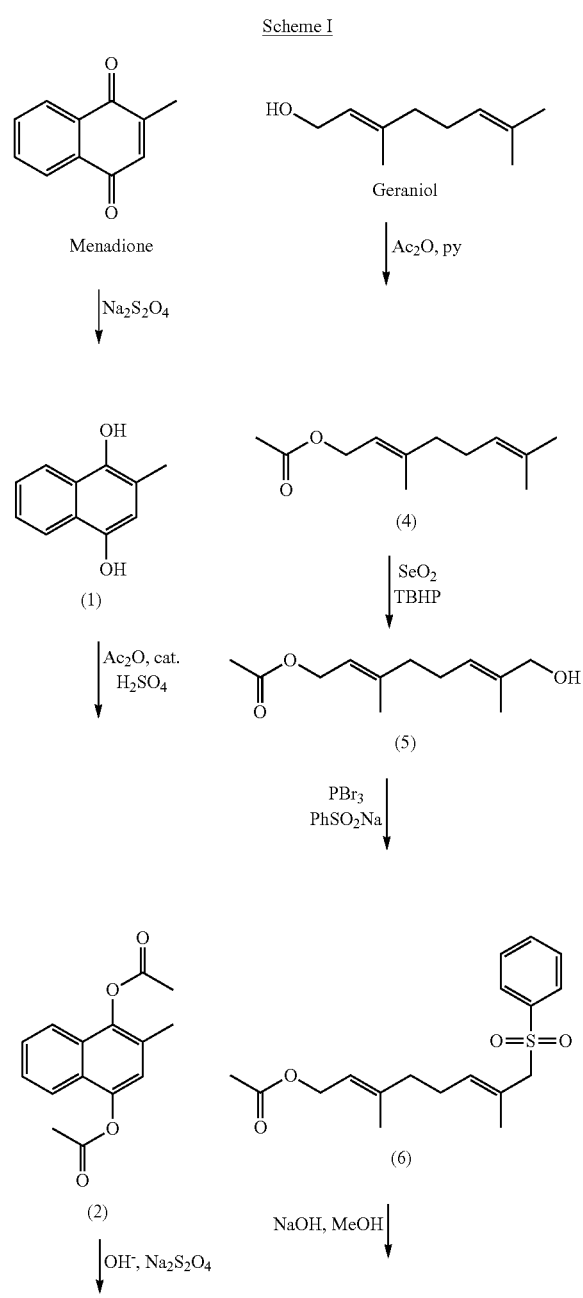

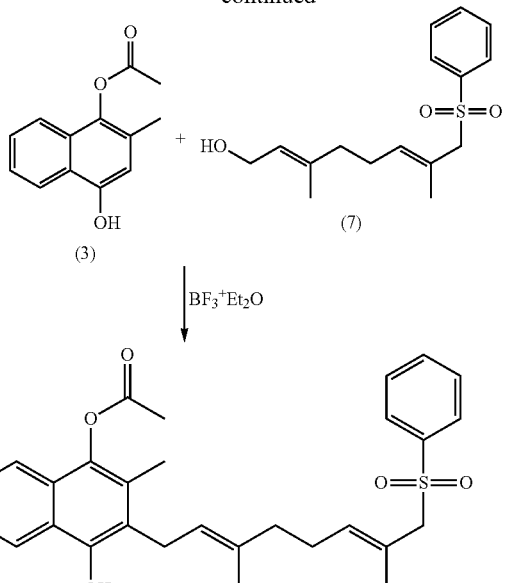

In an embodiment of the method for the preparation of compound (8) according to the invention as shown in the scheme I, commercially available menadione and geraniol are used as raw materials.

Menadione is reduces using sodium dithionite giving menadiol (1). Menadiol (1) is reacted in acylation reaction using acetic anhydride in the presence of a catalytic amount of Brønsted acid, such as sulfuric acid, giving compound (2). Compound (2) is subjected to selective deacetylation using any method known in the art, e.g., a method disclosed in WO/2016/060670, to obtain compound (3). Compounds (1) and (2) can be also obtained using other methods known in the art.

Geraniol is transformed into geranyl acetate (4) using acetic anhydride in pyridine or in other anhydrous solvent, e.g., methylene chloride, optionally with the use of catalytic amount of 4-dimethylaminopyridine (DMAP). Next, geranyl acetate (4) is oxidized with the use of $SeO_2$ and tert-butyl hydroperoxide using e.g., a method described by T. Wirth et al., Organoselenium Chemistry, Modern Developments in Organic Synthesis, Springer, 2000, to obtain compound (5). Free hydroxyl group of compound (5) is then transformed to bromide with the use of $PBr_3$, and next the bromide obtained is transformed into compound (6) with the use of sodium benzenesulfinate. Alkaline hydrolysis of compound (6) gives compound (7).

Compound (3) is subjected to Friedel-Crafts reaction with compound (7) in an organic solvent comprising chloroform, toluene, acetonitrile or a mixture thereof, in the presence of a catalytic amount of Lewis acid, e.g., boron trifluoride etherate, the reaction is then left stirring at ambient temperature, preferably at the temperature from 20° C. to 30° C., most preferably at 25° C., and then the precipitate form is filtered, which is compound (8), which is optionally rinsed with an organic solvent, such as acetone, chloroform, toluene, ethyl acetate or a mixture thereof. Compound (8) is then air dried, or dried using other methods known in the art. The method according to the invention leads to formation of compound (8) as a pure isomer E. The use of Lewis acid in amounts larger than 0.3 equivalent, and in particular in equimolar amounts or slightly larger than equimolar, e.g., 1.2 eq, leads to side reactions, difficulties in purification and drop of the yield. Depending on the temperature, reaction time is from few minutes to several dozen hours, e.g., 1 h, 6 h, 12 h, 18 h, 24 h, most preferably 24 h. Reaction time can be established using standard procedures of monitoring of reaction progress, such as TLC, HPLC or NMR.

In a preferred embodiment of the synthesis method according to the present invention, compound (8) is obtained in a crystalline form, which XRPD pattern in the range of diffraction angle of 5-70 degrees is shown in FIG. 1. XRPD measurements were performed in a classic Bragg-Brentano focus geometry using a D8 diffractometer (Bruker AXS). Samples were pressed on a glass dish with the dimensions of the recess around 15×20 mm and a depth of around 0.25 mm, and were places on the diffractometer axis with the longer recess dimension in the scattering plane. X-ray Cu lamp was used in the measurements, in an optical system with divergence of 1°, Ni (1:20) filter and LynxEye strip detector. Soller slits having a vertical divergence of 5° were used both in a primary beam system and detection system. A radius of a goniometer is R=217.5 mm. Cu lamp was loaded with a current of 40 mA and voltage of 40 kV with stability of 0.01%/8 h. After subtracting the measuring background, the diffractogram was adjusted to the sum of the maxima described by the analytical function (Pearson7) using Fityk program (ver.1.3.0). The resulting angular positions and the relative intensities of the peaks are given in the table below.

| Angle | Intensity |
| --- | --- |
| 7.71 | 3.84 |
| 8.77 | 1.62 |
| 10.79 | 2.24 |
| 11.62 | 0.85 |
| 11.75 | 1.66 |
| 12.44 | 0.98 |
| 12.56 | 2.28 |
| 13.33 | 1.97 |
| 14.54 | 14.76 |
| 14.65 | 4.7 |
| 15.33 | 9.48 |
| 15.76 | 5.4 |
| 16.88 | 0.48 |
| 17.47 | 100 |
| 18.18 | 45.04 |
| 18.57 | 20.6 |
| 19.40 | 4.7 |
| 20.05 | 6.23 |
| 21.56 | 33.29 |
| 21.24 | 10.06 |
| 20.80 | 1.82 |
| 20.63 | 1.96 |
| 22.75 | 4.66 |
| 23.03 | 4.33 |
| 23.24 | 4.24 |
| 23.62 | 8.17 |
| 24.82 | 15.58 |
| 25.28 | 11.9 |
| 23.77 | 1.95 |
| 26.75 | 3.5 |
| 27.12 | 4.85 |
| 27.26 | 0.97 |
| 27.57 | 6.69 |
| 27.75 | 3.52 |
| 28.09 | 1.95 |
| 29.02 | 1.45 |
| 29.21 | 5.54 |
| 30.82 | 4.73 |
| 28.49 | 0.85 |
| 28.79 | 2.13 |
| 30.10 | 0.97 |

-continued

| Angle | Intensity |
| --- | --- |
| 30.34 | 1.04 |
| 30.57 | 0.8 |
| 32.01 | 0.6 |
| 32.29 | 1.47 |
| 32.53 | 1.98 |
| 32.96 | 3.57 |
| 33.32 | 1.01 |
| 33.61 | 2.34 |
| 33.95 | 0.49 |
| 34.08 | 1.2 |
| 34.58 | 0.83 |
| 34.8 | 0.99 |
| 35.21 | 1.62 |
| 35.00 | 0.82 |
| 35.46 | 1.07 |
| 36.37 | 0.7 |
| 36.66 | 3.15 |
| 37.22 | 2.06 |
| 37.65 | 1.36 |
| 38.15 | 1.77 |
| 38.80 | 0.66 |
| 38.90 | 0.56 |
| 39.28 | 0.72 |

Figure 2:
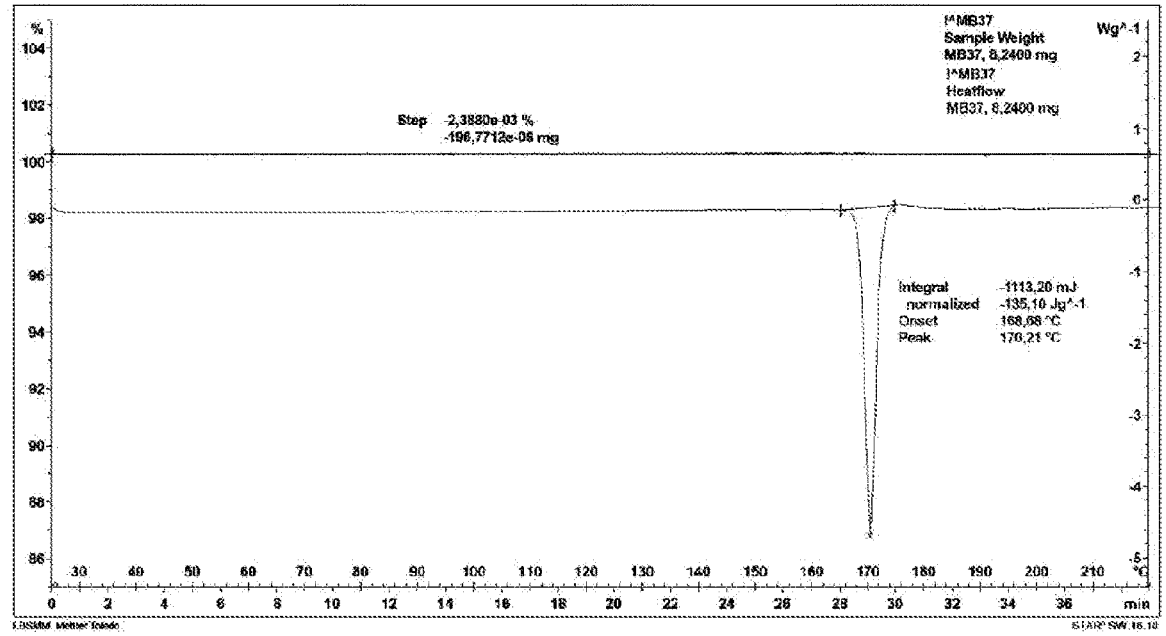
FIG. 2 shows DSC spectrum of a compound of formula (8) according to the invention.

In FIG. 2 a DSC spectrum of compound (8) is shown, with a single endotherm around 169° C. Compound (8) according to the invention is stable and can be long-term stored at the temperature up to 40° C. without signs of degradation.

Compound (8) can be easily transformed into 1,4-unsymmetrically protected menadiol derivatives, wherein one of the hydroxyl groups is protected with an acyl group such as acetyl, and the second of the hydroxyl groups of menadiol derivative is protected with an alkyl group, benzyl group or alkoxy group, such as ethoxymethyl or methoxymethyl. Compound (8) is therefore a useful intermediate compound in the synthesis of menaquinones, allowing for free selection of protecting groups, which is usually of significant importance due to reactivity, yield and ease of purification of derivatives. Compound (8) can be also used in the synthesis of menaquinones having a number of isoprene groups other than 7, including MK-4, MK-5, MK-6, MK-8, MK-9, MK-10, MK-11, MK-12 or MK-13 by adjusting the length of the polyisoprene chain of compounds reacting with compound (8).

Scheme 11 shows an embodiment of the method for the preparation of compound (11). Compound (8) is subjected to alkylation reaction of hydroxyl group in position 4 of menadiol derivative, giving compound (9). Alkylation reactions are performed using alkyl salts, such as dimethyl sulfate or diethyl sulfate, alkoxy halides such as chloromethylethyl ether or chloromethylmethyl ether, benzyl halides such as benzyl chloride or benzyl bromide. Alkylation reactions are performed in the presence of a base, such as tertiary amine, e.g., diisopropylethylamine. After isolation, crude compound (9) does not require purification and is used in the next step. In particular, compound (9) does not require purification by chromatography.

Compound (9) is transformed into compound (10) as a result of hydrolysis. Preferably, hydrolysis is performed in the presence of an inorganic base, such as sodium hydroxide or potassium hydroxide, in a solvent comprising methanol, ethanol, water, acetonitrile, tetrahydrofuran or a mixture thereof. After isolation, crude compound (10) does not require purification and is used in the next step. In particular, compound (10) does not require purification by chromatography.

Compound (10) is subjected to alkylation reaction of a hydroxyl group at position 1 of menadiol derivative, giving compound (11). Said reaction is analogous to the alkylation reaction of hydroxyl group at position 4 described above. After isolation, crude compound (11) does not require purification and is used in the next step. In particular, compound (11) does not require purification by column chromatography.

Scheme II

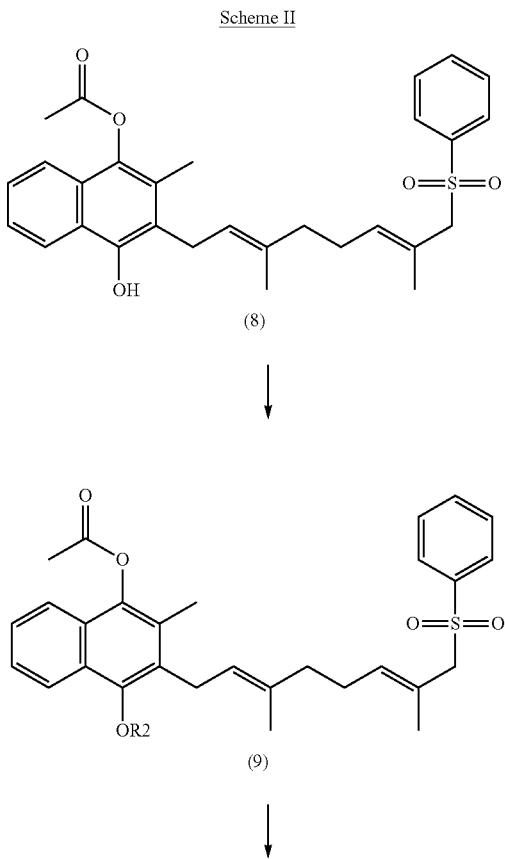

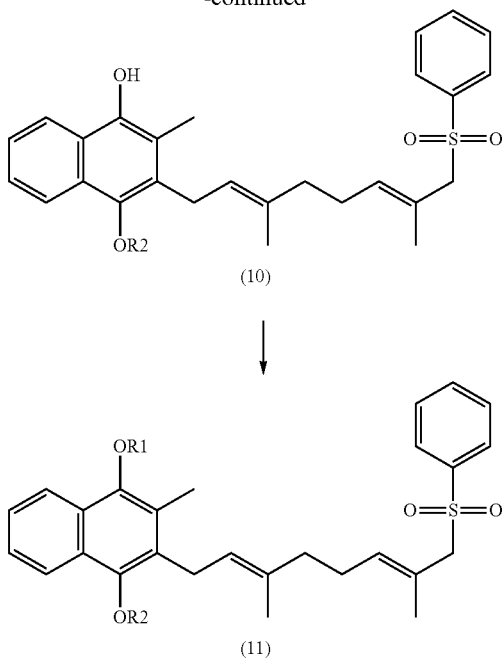

wherein R1 and R2 are independently —C$_{1-6}$-alkyl, —(CH$_2$)$_n$—O—C$_{1-6}$-alkyl or benzyl, and wherein n is 1 or 2.

In order to obtain menaquinone MK-7 by the method according to the present invention, steps illustrated in embodiment shown in scheme III are performed. Compound (11) is subjected to Biellmann reaction with compound (17), giving compound (18). Next, compound (18) is subjected to desulfonylation reaction, giving compound (19). Finally, compound (19) is subjected to oxidation reaction, giving compound (20). Preferably, the oxidation reaction is performed using cerium ammonium nitrate. Most preferably, the oxidation reaction is performed in a mixture of ethyl acetate and water. Compound (20) can be purified by column chromatography, and then subjected to crystallization, preferably from the mixture of ethyl acetate and ethanol, giving compound (20) having a purity above 99%.

Scheme III

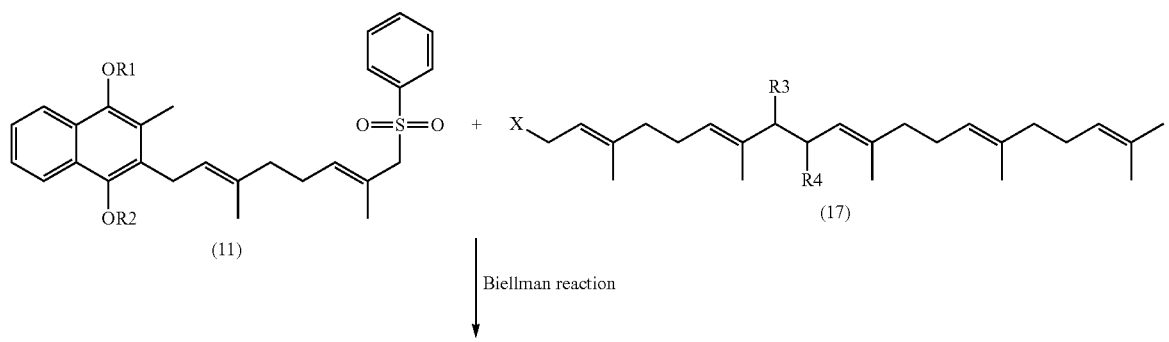

Biellman reaction

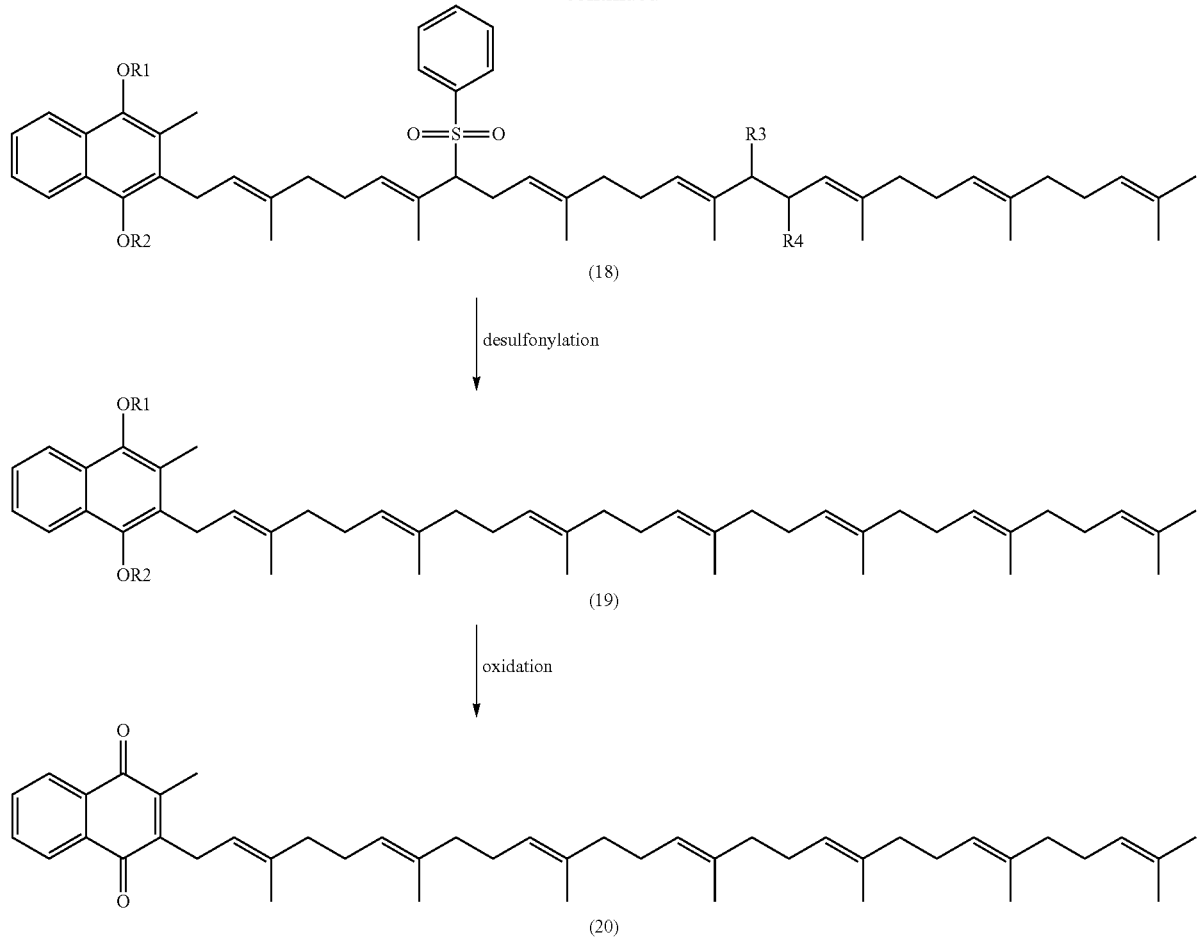

wherein R1 and R2 are independently —C1-6-alkyl, —(CH2)n-O—C1-6-alkyl or benzyl, and wherein n is 1 or 2, wherein X is Br, Cl or I, wherein both R3 and R4 are hydrogen or one of R3 and R4 is hydrogen and the second is phenylsulfonyl group.

Scheme IV shows an embodiment in which compound (17) having one phenylsulfonyl group and wherein X is Br is obtained. Said compound is known and may be obtained using any known methods. In an embodiment illustrated by Scheme IV, commercially available farnesol (E,E,E-farnesol) is used. Compound (14) is obtained from compound (5) as a result of substitution of hydroxyl group with a bromine atom.

Scheme IV

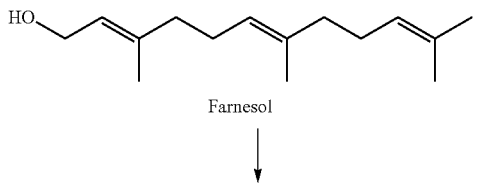

Farnesol

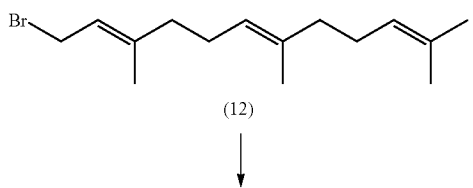

(12)

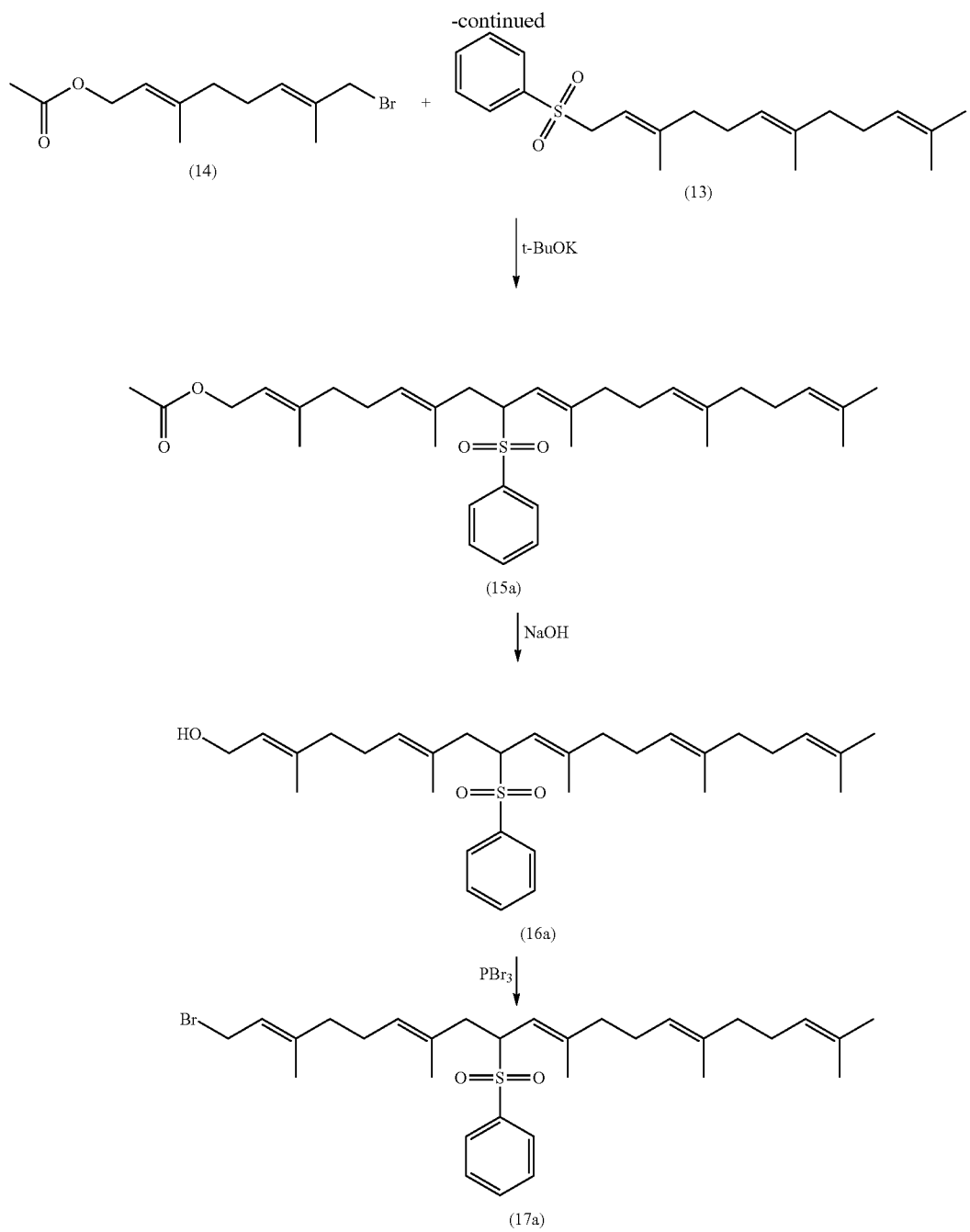

The advantages of the present invention are a provision of high yield and cheap method for the preparation of MK-7 on an industrial scale. In the present invention, a coupling reaction of an isoprene chain with a menadiol derivative leads to a crystalline compound (8) with high yield and purity. According to the invention, it allows to eliminate the drawbacks known for Kumada coupling, where expensive palladium catalysts are employed, as well as high regime in the preparation of organomagnesium derivative has to be maintained. According to the present invention, raw materials are cheap and commercially available in large quantities. Lewis acid employed in the synthesis of compound (8), such as e.g., easily available boron trifluoride etherate, is used in catalytic amounts from 0.1 to 0.3 equivalent. Furthermore, said reaction proceeds at mild conditions, without the need of cooling or heating to high temperatures, and the obtained, substantially pure, compound is isolated by simple filtration, allowing for elimination of tedious and expensive chromatographic purification operations. In the method for the preparation of MK-7 according to the present invention, in the desulfonylation reaction, only two, but not three sulfonyl groups are removed, as is the case of some other known methods, thus limiting the usage of the reducing reagent, which is of vital importance in case of high price of the reagent. Furthermore, the present invention allows to eliminate a step of farnesol oxidation, which proceeds with low yield and requires tedious purification.

The subject of the present invention is illustrated by the following examples, which do not limit its scope.

EXAMPLES

Abbreviations used:

DCM—dichloromethane; THF—tetrahydrofuran; DMAP—4-dimethylaminopyridyne

Example 1 Preparation of Menadiol (1) and Diacetylmenadiol (2)

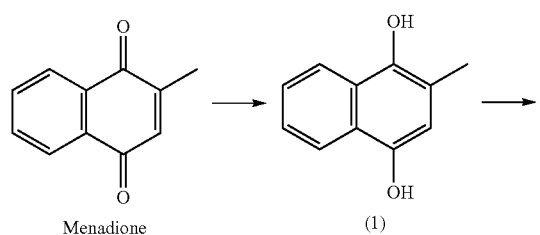

Menadione (1)

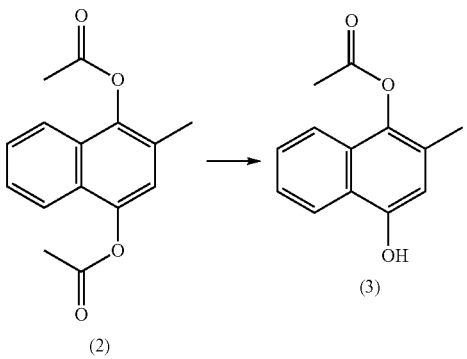 [SMILES: CC(=O)Oc1cc(C)c(OC(C)=O)c2ccccc12 ; CC(=O)Oc1c(C)cc(O)c2ccccc12]

(2)

A solution of menadione 200 g (1 eq) in ethyl acetate (1700 ml), and a solution of sodium dithionite 333 g (1.65 eq) in water were added to a flask. It was vigorously stirred at 25° C. for 15 min. Stirring was stopped, phases were separated. Organic phase was rinsed with water and brine. It was concentrated in vacuo, with further azeotropic drying with toluene to obtain slightly violet precipitate of compound (1). The precipitate was directed to acylation without further purification.

To the precipitate it was added toluene 700 ml, and acetic anhydride 400 ml (3.5 eq), and a catalytic amount of sulfuric acid. After 1 h at 50° C., the solution was cooled and excess anhydride was decomposed with water at 25° C. Phases were separated, rinsed with water and brine. Organic layer was concentrated in vacuo to obtain orange precipitate. After recrystallization from methanol 230 g of white precipitate was obtained. Yield after two steps 77%.

$^1$H NMR (500 MHz, CDCl$_3$) δ 7.85-7.79; (m, 1H), 7.78-7.73; (m, 1H), 7.50; (dddd, 2H), 7.15; (s, 1H), 2.48; (s, 3H), 2.46; (s, 3H), 2.33; (s, 3H), $^{13}$C NMR (126 MHz, CDCl$_3$) δ 169.39, 168.86, 144.11, 142.13, 127.90, 127.08, 126.49, 126.16, 126.02, 121.46, 121.16, 120.71, 20.99, 20.58, 16.50.

Example 2 Preparation of Monoacetylmenadiol—Compound (3)

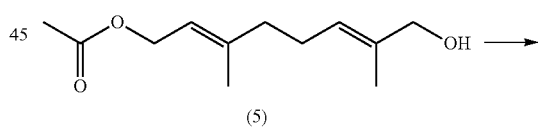

Substrate (2) 230 g (1 eq), and 1150 ml of a mixture of methanol:water (10:1 v/v) were added to a flask; around 180 ml of DCM was added as a substrate solubility improver. 115 ml of tert-butylamine (1.25 eq) was added in one portion. It was stirred for around 3 h at 25° C. until substrate disappearance. Reaction was quenched with 1M aqueous HCl solution, to pH below 6. It was extracted with DCM, rinsed with water and ammonium chloride aqueous solution. It was concentrated in vacuo to obtain solidifying oil. After crystallization from toluene 166 g of pale pink precipitate was obtained. Yield 86%.

$^1$H NMR (500 MHz, CDCl$_3$) δ 7.96; (d, 1H), 7.64; (d, 1H), 7.48; (ddd, 1H), 7.38; (ddd, 1H), 6.32; (s, 1H), 5.88; (s, 1H), 2.50; (s, 3H), 2.17; (s, 3H), $^{13}$C NMR (126 MHz, CDCl$_3$) δ 170.67, 149.57, 137.61, 127.68, 127.10, 126.56, 124.73, 124.03, 122.30, 120.45, 111.14, 20.81, 16.43.

Example 3 Synthesis of the Bromide—Compound (14)

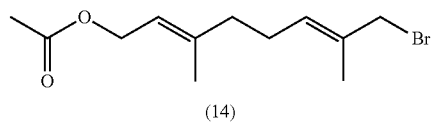

166 g of substrate (5) (1 eq) in 450 ml of THF-u was introduced to a reactor. While keeping the temperature at around 0° C., 11 ml of phosphorus tribromide (0.35 eq) was added dropwise. After one hour, the reaction was quenched with bicarbonate solution. Next, 460 ml of cyclohexane was added, and after mixing, phases were separated. Organic phase was rinsed with water and brine, and then concentrated do dryness. Compound (14) was obtained in amount of 198 gas an orange oil. Yield 92%.

Example 4 Sulfone Synthesis—Compound (6)

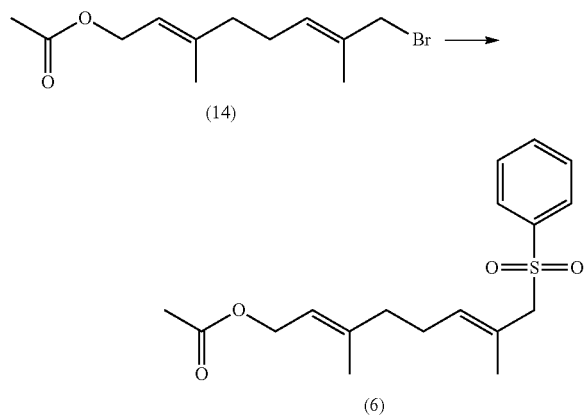

158 g of sodium benzenesulfinate (1.1 eq) and 700 ml of dimethylformamide was added to a reactor, and then a mixture of 241 g of bromide (14) (1 eq) in 600 ml of ethyl acetate was added. The whole mixture was stirred for 3 h at 25° C. Reaction was quenched with water. It was extracted with ethyl acetate. Organic layers were rinsed with water, brine, and concentrated in vacuo to obtain 246 g of an orange oil. Yield 83%.

$^1$H NMR (500 MHz, CDCl$_3$) δ 7.86-7.80; (m, 2H), 7.66-7.59; (m, 1H), 7.53; (t, 2H), 5.23; (tq, 1H), 5.06-5.00; (m, 1H), 4.54; (d, 2H), 3.70; (s, 2H), 2.09-2.01; (m, 2H), 2.04; (s, 3H), 1.87; (t, 2H), 1.74; (d, 3H), 1.63; (d, 3H), $^{13}$C NMR (126 MHz, CDCl$_3$) δ 171.16, 141.28, 138.60, 135.46, 133.63, 129.01, 128.60, 123.88, 118.87, 66.26, 61.32, 38.49, 26.55, 21.14, 16.84, 16.47.

Example 5 Hydrolysis—Compound (7)

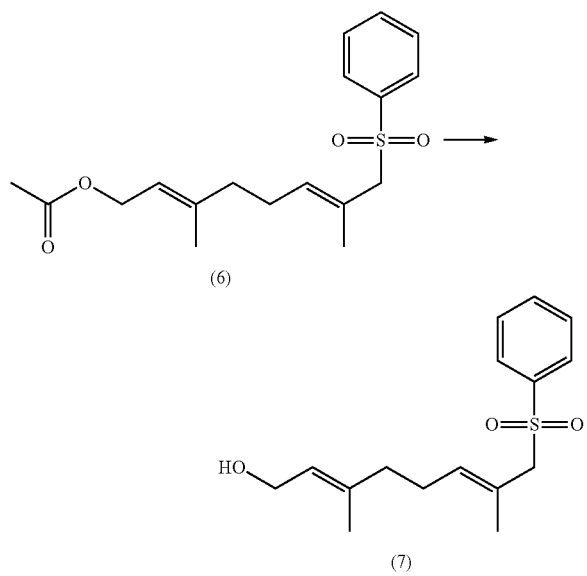

225 g of substrate (6) (1 eq) and 550 ml of a mixture methanol:water (10:1 v/v) were added to a reactor. Next, 40 g of sodium hydroxide (1.1 eq) was added. It was stirred for two hours at 45° C. The mixture was cooled and extracted with DCM. Organic layers were rinsed with water, brine and concentrated in vacuo. 164 g of an orange oil was obtained. Yield 83%.

$^1$H NMR (500 MHz, CDCl$_3$) δ 7.87-7.83; (m, 2H), 7.67-7.60; (m, 1H), 7.54; (dd, 2H), 5.34; (td, 1H), 5.17-5.11; (m, 1H), 4.12; (d, 2H), 3.70; (s, 2H), 2.10; (q, 2H), 1.92; (t, 2H), 1.74; (d. 3H), 1.62; (d, 3H), 1.55; (bs, 1H). $^{13}$C NMR (126 MHz, CDCl$_3$) δ 138.96, 138.39, 135.85, 133.67, 129.10, 128.55, 124.39, 123.56, 66.30, 59.40, 38.52, 26.50, 17.00, 16.19.

Example 6 Sulfone Synthesis—Compound (13)

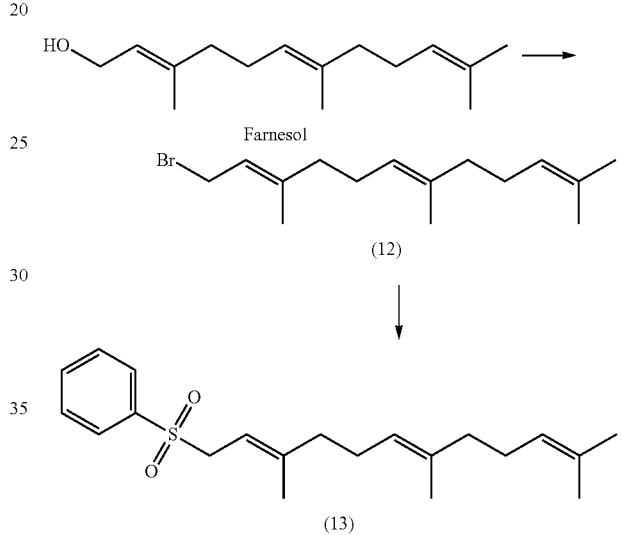

220 g of farnesol (1 eq) in 550 ml of THF was introduced to a reactor. It was cooled to around 0° C. and 33 ml of phosphorous tribromide (0.35 eq) was added dropwise. After one hour stirring in an ice bath, the reaction was quenched with aqueous sodium bicarbonate solution. 550 ml of ethyl acetate was added to the mixture, and after the extraction, phases were separated. Organic layer was rinsed with water and brine. After evaporation in vacuo, the product was directed to substitution with sulfonate without purification.

To the reactor containing a mixture of 180 g sodium benzenesulfinate (1.1 eq) in 800 ml of dichloromethane, a solution of bromide (12) in 600 ml of ethyl acetate was added. The whole mixture was stirred for two hours at 25° C. Reaction was quenched with water. After separation of the phases, organic layer was rinsed with water and brine. After evaporation, 343 g of sulfone (13) was obtained. Yield for two steps 84%.

$^1$H NMR (500 MHz, CDCl$_3$) δ 7.87; (dt, 2H), 7.63; (td, 1H), 7.53; (t, 2H), 5.19; (td, 1H), 5.12-5.02; (m, 2H), 3.81; (d, 2H), 2.10-1.94; (m, 8H), 1.68; (d, 3H), 1.60; (s, 3H), 1.58; (d, 3H), 1.31; (d, 3H), $^{13}$C NMR (126 MHz, CDCl$_3$) δ 146.56, 138.82, 135.86, 133.63, 131.53, 129.06, 128.70, 124.35, 123.45, 110.44, 56.24, 39.83, 39.81, 26.82, 26.30, 25.83, 17.82, 16.31, 16.12.

Example 7 Biellmann Coupling—Compound (15a)

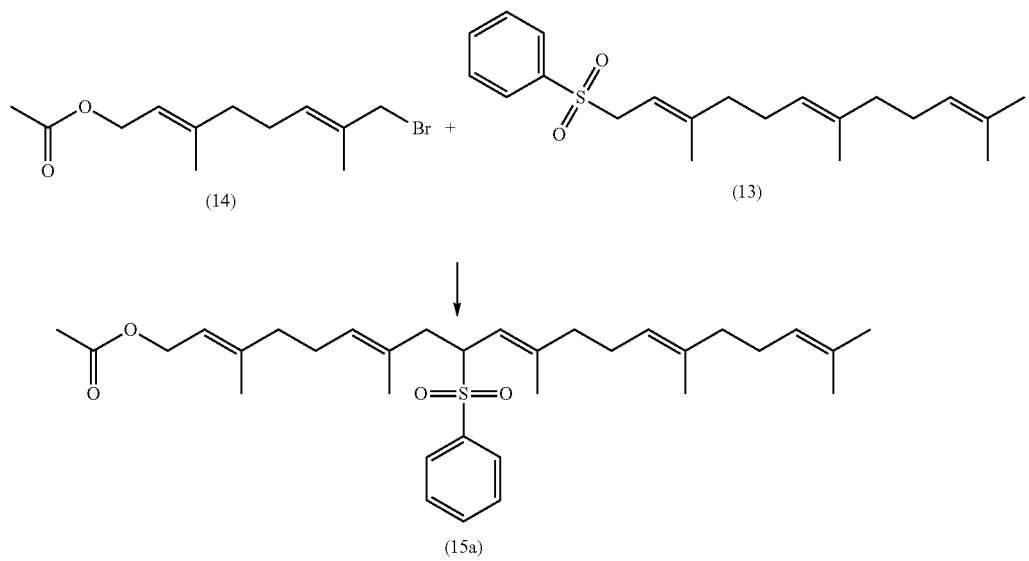

750 ml of THF, 272 g of sulfone (13) (1 eq.), 248 g of bromide (14) (1.15 eq) were added to a reactor. It was cooled to −10° C. while stirring, and a solution of 99 g potassium tert-butoxide (1.15 eq) in 500 ml of THF was added dropwise. After an hour, the reaction was quenched with water. The mixture was extracted with ethyl acetate, organic layer was rinsed with water and brine, and concentrated in vacuo to obtain 416 g of an orange oil. Yield 98%.

$^1$H NMR (500 MHz, CDCl$_3$) δ 7.87-7.80; (m, 2H), 7.64-7.57; (m, 1H), 7.50; (t, 2H), 5.33-5.26; (m, 1H), 5.12; (t, 1H), 5.10-5.00; (m, 2H), 4.90; (d, 1H), 4.55; (d, 2H), 3.87; (ddd, 1H), 2.87; (d, 1H), 2.27; (dd, 1H), 2.11-2.01; (m, 4H), 2.03; (s, 3H), 2.01-1.87; (m, 8H), 1.67; (d, 3H), 1.66; (d, 3H), 1.59; (d, 3H), 1.57; (d, 3H), 1.52; (d, 3H), 1.16; (d, 3H), $^{13}$C NMR (126 MHz, CDCl$_3$) δ 171.18, 145.19, 141.93, 138.12, 135.73, 133.46, 131.51, 130.48, 129.37, 128.80, 127.74, 124.32, 123.56, 118.54, 117.39, 63.60, 61.41, 39.83, 39.82, 39.30, 37.44, 26.82, 26.49, 26.37, 25.80, 21.15, 17.80, 16.53, 16.47, 16.07.

Example 8 Hydrolysis—Compound (16a)

(15a) ⟶

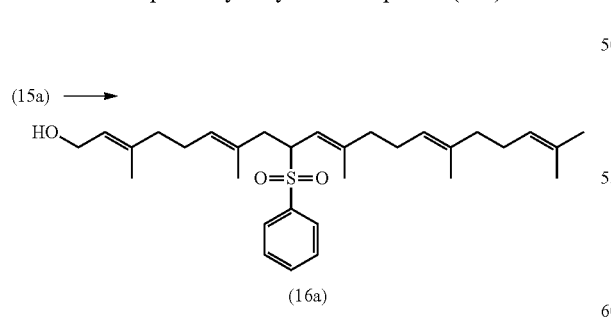

416 g of substrate (15a), 1300 ml of a mixture methanol:water (10:1 v/v) were added to a reactor. 38 g of sodium hydroxide (1.25 eq) was added to the mixture and was stirred for 2 h at 45° C. Next, the mixture was cooled and extracted with DCM. Organic layers were rinsed with water, brine, and concentrated in vacuo. After evaporation, the oil was subjected to silica gel chromatography eluting with cyclohexane:ethyl acetate. After evaporation of the respective fractions, 259 g of a yellow oil was obtained. Yield 67%.

$^1$H NMR (500 MHz, CDCl$_3$) δ 7.87-7.81; (m, 2H), 7.64-7.57; (m, 1H), 7.50; (t, 2H), 5.37; (tq, 1H), 5.14; (t, 1H), 5.11-5.00; (m, 2H), 4.94-4.87; (m, 1H), 4.12; (d, 2H), 3.88; (td, 1H), 2.91-2.84; (m, 1H), 2.28; (dd, 1H), 2.06; (dp, 4H), 2.01-1.87; (m, 8H), 1.67; (d, 3H), 1.63; (d, 3H), 1.60-1.58; (m, 3H), 1.57; (d, 3H), 1.53; (s, 3H), 1.41; (bs, 1H), 1.16; (d, 3H), $^{13}$C NMR (126 MHz, CDCl$_3$) δ 145.17, 139.40, 138.13, 135.75, 133.47, 131.55, 130.37, 129.38, 128.81, 127.95, 124.34, 123.65, 123.58, 117.42, 63.63, 59.45, 39.84, 39.32, 37.52, 26.84, 26.49, 26.47, 25.82, 17.82, 16.48, 16.36, 16.09, 16.07.

Example 9 Bromide Synthesis—Compound (17a)

(16a) ⟶

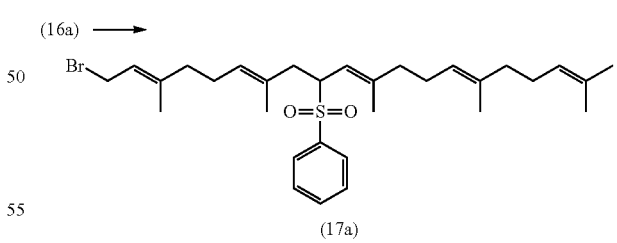

1.10 g of substrate (16a) (1 eq) in 450 ml of THF and 10 ml of pyridine were added to a reactor. While keeping at around 0° C., 7.3 ml of phosphorous tribromide (0.35 eq) was added dropwise. After one hour stirring at 0° C., the reaction was quenched with bicarbonate solution. Next, 460 ml of toluene was added, and after mixing, phases were separated. Organic phase was rinsed with water and brine, and then concentration to dryness. 116 g of an orange oil was obtained. Yield 92%.

Example 10 Friedel-Crafts Alkylation—Compound (8)

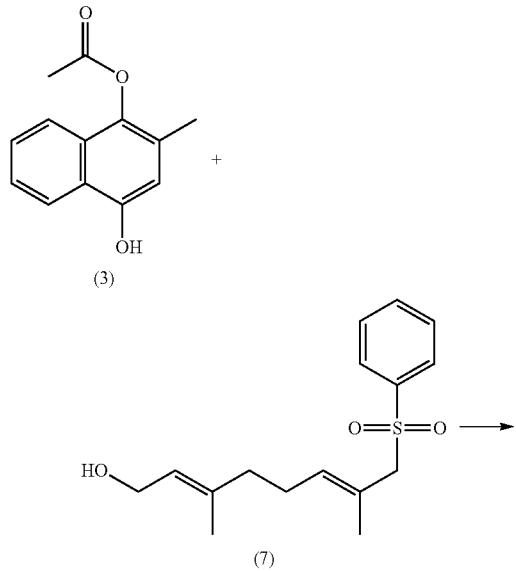

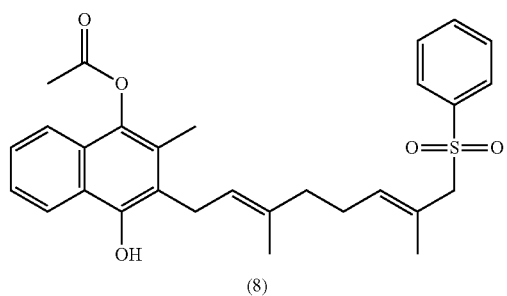

11.5 g of monoacetylmenadiol (3) (1 eq), 23 g of compound (7) (1.17 eq) in 70 ml of a mixture of chloroform: toluene (6:4, v/v) were added to a reactor. Next, catalytic amount of boron trifluoride etherate (0.1 eq) was added to the mixture. The mixture was left stirring overnight (18 h) at 25° C. Next, the precipitate was filtered, rinsed with 10 ml of acetone. After air drying, 15.1 g of a white precipitate was obtained. Yield 57%, purity >95%.

$^1$H NMR (500 MHz, CDCl$_3$) δ 8.09; (d, 1H), 7.81; (d, 2H), 7.64; (d, 1H), 7.58; (t, 1H), 7.49-7.44; (m, 3H), 7.44-7.38; (m, 1H), 5.78; (s, 1H), 5.11-5.03; (m, 2H), 3.69; (s, 2H), 3.46; (d, 2H), 2.47; (s, 3H), 2.23; (s, 3H), 2.10; (q, 2H), 1.94; (t, 2H), 1.79; (d, 3H), 1.75; (d, 3H), $^{13}$C NMR (126 MHz, CDCl$_3$) δ 169.80, 147.70, 138.82, 138.14, 137.15, 135.61, 133.63, 129.06, 128.52, 126.48, 126.27, 126.25, 125.13, 124.15, 123.81, 122.43, 121.85, 120.73, 120.17, 66.29, 38.63, 26.43, 26.36, 20.77, 17.01, 16.23, 13.59. Melting point 168.5-170° C.

Example 11 Protection of Hydroxyl Group—Compound (9a)

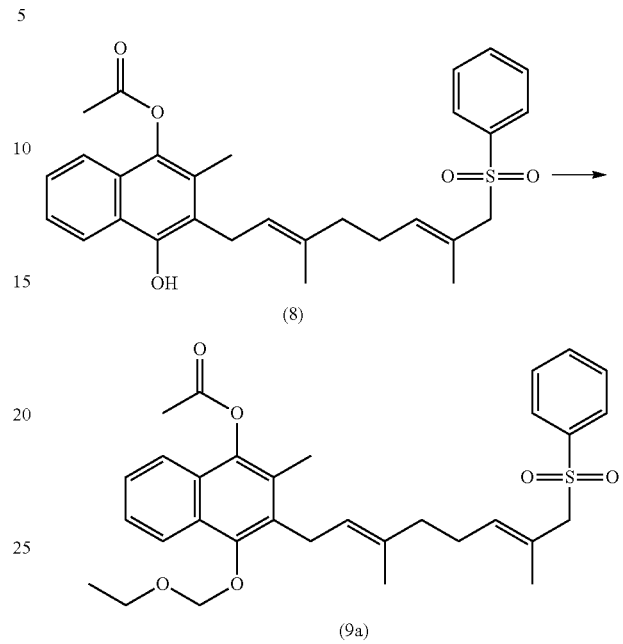

122 g of compound (8) (1 eq) in 730 ml of DCM was added to a reactor. Next, 80 ml of diisopropylethylamine (2 eq) and 47.5 ml of chloromethyl ethyl ether (2 eq) were added. It was stirred at 25° C. overnight. The reaction was quench with water. After separation of the phases, organic phase was rinsed with water and brine. After evaporation, 119 g was obtained. Yield 94%.

$^1$H NMR (500 MHz, CDCl$_3$) δ 8.08; (dt, 1H), 7.81-7.75; (m, 2H), 7.72-7.65; (m, 1H), 7.59-7.52; (m, 1H), 7.51-7.40; (m, 4H), 5.13; (s, 2H), 5.01-4.91; (m, 2H), 3.92; (q, 2H), 3.66; (s, 2H), 3.57; (d, 2H), 2.48; (s, 3H), 2.18; (s, 3H), 2.01; (q, 2H), 1.82; (t, 2H), 1.73; (t, 6H), 1.29; (t, 3H), $^{13}$C NMR (126 MHz, CDCl$_3$) δ 169.33, 148.89, 141.30, 138.39, 135.78, 134.99, 133.57, 130.80, 128.93, 128.60, 127.72, 127.15, 126.61, 126.36, 125.83, 123.57, 123.37, 122.77, 121.08, 99.13, 66.25, 66.03, 38.60, 26.77, 26.76, 20.77, 16.79, 16.35, 15.36, 13.28.

Example 12 Hydrolysis—Compound (10a)

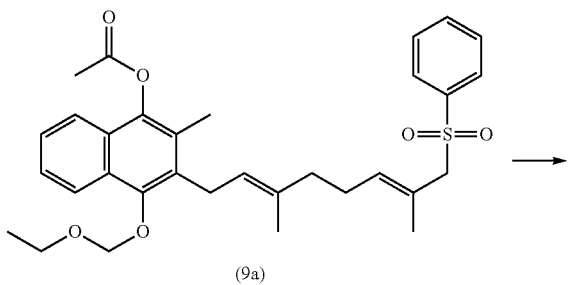

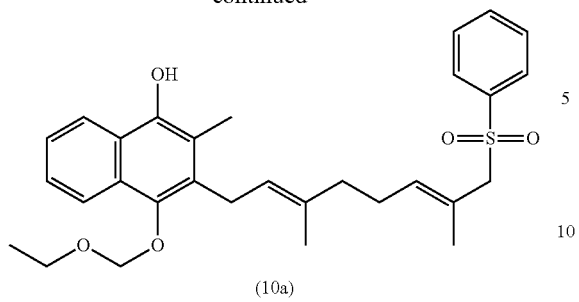

(10a)

82 g of compound (9a) (1 eq) and 360 ml of a mixture of methanol:water (10:2 v/v) were added to a reactor. 7.1 g of sodium hydroxide (1.2 eq) was added. It was stirred for 1 h at 25° C. The reaction was quenched with water and neutralized with a mixture of 1M aqueous solution of hydrochloric acid. It was extracted with DCM. Organic phases were rinsed with water and ammonium chloride aqueous solution. It was concentrated in vacuo to obtain 70 g of an orange oil. Yield 92%.

$^1$H NMR (600 MHz, CDCl$_3$) δ 8.06; (dd, 1H), 8.03; (dd, 1H), 7.81-7.75; (m, 2H), 7.57-7.48; (m, 1H), 7.44; (td, 3H), 5.30-5.25; (m, 1H), 5.09; (s, 2H), 4.98; (dtd, 2H), 3.91; (q, 2H), 3.64; (s, 2H), 3.56; (d, 2H), 2.26; (s, 3H), 2.06-1.98; (m, 2H), 1.83; (t, 2H), 1.73; (d, 3H), 1.71; (d, 3H), 1.28; (t, 3H).

Example 13 Protection of a Hydroxyl Group with an Alkoxy Group—Compound (11a)

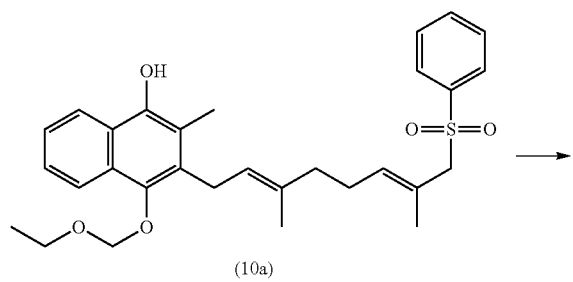

(10a) →

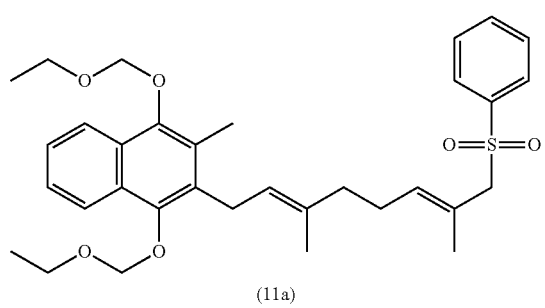

(11a)

28.6 g of compound (10a) (1 eq) in 130 ml of DCM was added to a reactor. Next, 21 ml of diisopropylethylamine (2 eq) and 11.1 ml of chloromethylethyl ether (2 eq) were added. It was stirred at 25° C. overnight. The reaction was quenched with water. After separation of the phases, organic phase was rinsed with water, brine, and concentrated in vacuo. 28.5 g of an orange oil having a purity of 90% was obtained. Yield 88%.

$^1$H NMR (500 MHz, CDCl$_3$) δ 8.09-8.01; (m, 2H), 7.78; (dt, 2H), 7.59-7.52; (m, 1H), 7.49-7.40; (m, 4H), 5.14; (s, 2H), 5.12; (s, 2H), 5.01-4.93; (in, 2H), 3.93; (dq, 4H), 3.65; (s, 2H), 3.56; (d, 2H), 2.36; (s, 3H), 2.06-1.97; (m, 2H), 1.82; (t, 2H), 1.73; (dd, 6H), 1.29; (td, 6H), $^{13}$C NMR (126 MHz, CDCl$_3$) δ 148.02, 147.48, 138.46, 135.87, 134.84, 133.57, 131.12, 128.95, 128.60, 128.11, 127.90, 127.42, 125.71, 125.56, 123.59, 123.52, 122.57, 122.33, 99.07, 98.64, 66.29, 65.99, 38.65, 26.90, 16.79, 16.40, 15.40, 15.38, 13.44.

Example 14 Biellmann Coupling—Compound (18a)

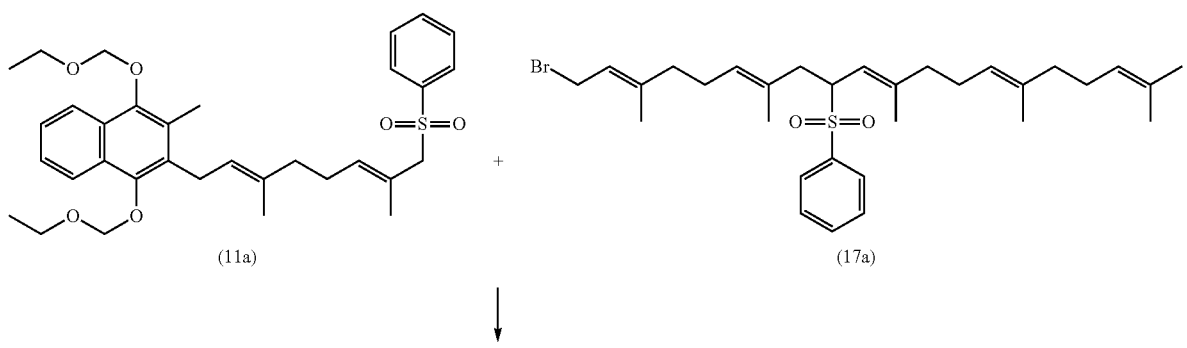

(11a)     +     (17a)

↓

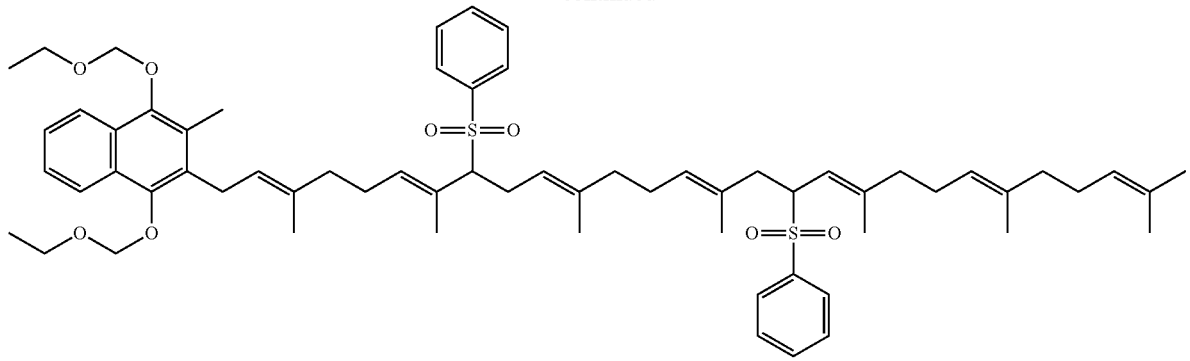

(18a)

96.5 g of compound (11a) (1 eq), 109 g of compound (17a) (1.14 eq) and 570 ml of THF were added to a reactor. Next, the mixture was cooled to −30° C., and 200 ml of 1M NaHMDS (Sodium hexamethyldisilazide) solution in THF was added dropwise. After one hour, the reaction was quenched with water. The mixture was extracted with ethyl acetate. Organic phases were rinsed with water, brine, and concentrated. 177 g of an orange oil was obtained, which was directed to desulfonylation.

$^1$H NMR (500 MHz, CDCl$_3$) δ 8.10-8.01; (m, 2H), 7.82 (dd, 2H), 7.76; (dd, 2H), 7.60; (td, 1H), 7.56-7.52; (m, 1H), 7.49; (t, 2H), 7.47-7.40; (m, 4H), 5.13; (d, 4H), 5.12-5.04; (m, 2H), 5.04-4.94; (m, 3H), 4.88; (d, 1H), 4.84; (t, 1H), 3.93; (dq, 4H), 3.84; (td, 1H), 3.61-3.52; (m, 2H), 3.42; (dd, 1H), 2.85; (d, 1H), 2.82-2.74; (m, 1H), 2.60-2.48; (m, 1H), 2.36; (s, 3H), 2.24; (dd, 1H), 2.04; (q, 2H), 1.99-1.80; (m, 14H), 1.72; (s, 3H), 1.67; (d, 3H), 1.61; (s, 3H), 1.59; (s, 3H), 1.56; (s, 3H), 1.55; (s, 3H), 1.47; (s, 3H), 1.29; (td, 6H), 1.13; (d, 3H).

$^{13}$C NMR (126 MHz, CDCl$_3$) δ 148.02, 147.51, 145.15, 138.21, 138.15, 138.10, 135.74, 135.62, 135.05, 133.47, 133.42, 131.56, 131.12, 130.20, 130.18, 129.37, 128.98, 128.81, 128.80, 128.14, 128.07, 128.05, 127.90, 127.43, 126.87, 125.72, 125.58, 124.33, 123.59, 123.38, 122.59, 122.36, 119.04, 117.43, 99.10, 98.65, 77.42, 77.16, 76.91, 74.16, 66.02, 66.01, 63.64, 53.56, 39.85, 39.49, 38.70, 37.47, 26.94, 26.91, 26.85, 26.51, 25.84, 24.09, 17.83, 16.47, 16.40, 16.09, 16.04, 16.02, 15.42, 15.40, 13.79, 13.49.

Example 15 Desulfonylation—Compound (19a)

(18a) ⟶

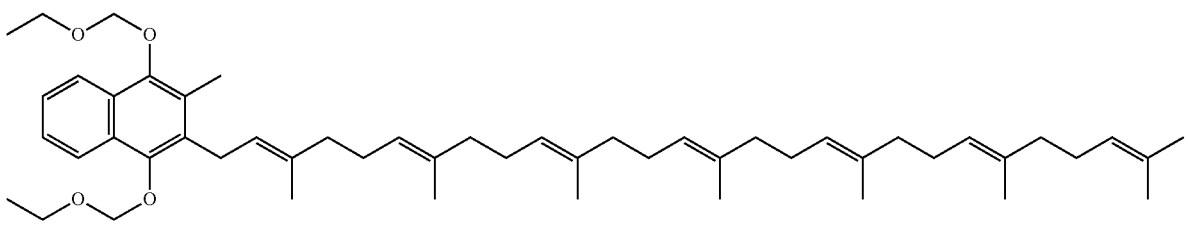

(19a)

174 g of compound (18a) (1 eq) in 400 ml of THF was added to a reactor. The solution was cooled to around 0° C. and 1M superhydride (lithium triethylborohydride) (3 eq) solution in THF was added dropwise. Next, 8 g of palladium catalyst Pd(dppe)Cl$_2$ (0.15 eq) was added. It was stirred for 2 h at 0° C., and then the reaction was quenched with water. The mixture was extracted with cyclohexane. Organic layers were rinsed with water, brine, and concentrated in vacuo. The resulting oil was subjected to silica gel chromatography using a mixture of cyclohexane:toluene 1:1 (v/v) as eluent. It was concentrated to dryness to give 101 g of a yellow oil. Yield 79%.

$^1$H NMR (500 MHz, CDCl$_3$) δ 8.10-8.02; (m, 2H), 7.48-7.41; (m, 2H), 5.14; (d, 4H), 5.16-5.02; (m, 7H), 3.93 (qd, 4H), 3.60 (d, 2H), 2.40 (s, 3H), 2.11-1.92; (m, 24H), 1.80; (d, 3H), 1.69; (d, 3H), 1.63-1.55; (m, 18H), 1.30; (td, 6H), $^{13}$C NMR (126 MHz, CDCl$_3$) δ 147.93, 147.45, 135.88, 135.28, 135.09, 135.06, 135.04, 135.02, 131.40, 131.37, 128.12, 127.94, 127.60, 125.60, 125.47, 124.56, 124.43, 124.42, 124.41, 124.34, 124.16, 122.99, 122.64, 122.32, 99.11, 98.61, 77.41, 77.16, 76.91, 66.00, 39.88, 39.87, 39.86, 39.81, 26.97, 26.92, 26.87, 26.85, 26.83, 26.82, 26.79, 25.84, 17.82, 16.60, 16.16, 16.14, 15.41, 15.40, 13.42.

Example 16 Oxidation—Compound (20)

(19a) ⟶

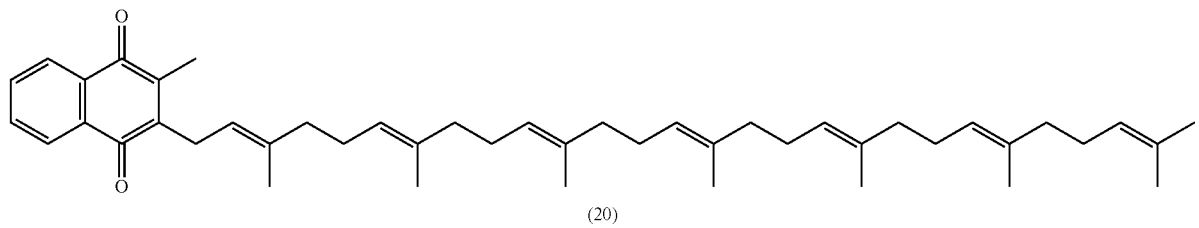

(20)

99 g of compound (19a) (1 eq) in 475 ml of ethyl acetate was added to a reactor together with a solution of 148 g of cerium ammonium nitrate (CAN) (2.1 eq) in 525 ml of water. It was vigorously stirred at 25° C. for 15 min. Layers were separated. Organic phase was rinsed with water, brine, and filtered through a pad of silica gel, and concentrated. After evaporation, 83 g of yellow crystallizing oil was obtained. After crystallization from a mixture of ethyl acetate and ethanol, 47 g of compound (20) having a purity above 99% was obtained. Yield 56%.

$^1$H NMR (500 MHz, CDCl$_3$) δ 8.12-8.04; (m, 2H), 7.72-7.65; (m, 2H), 5.14-5.04; (m, 7H), 3.37; (d, 2H), 2.19 (s, 3H), 2.11-1.89; (m, 24H), 1.79; (s, 3H), 1.68; (s, 3H), 1.59; (s, 12H), 1.56; (s, 6H). $^{13}$C NMR (126 MHz, CDCl$_3$) δ 185.60, 184.66, 146.28, 143.49, 137.70, 135.36, 135.07, 135.06, 135.05, 135.02, 133.47, 133.41, 132.31, 132.27, 131.40, 126.44, 126.33, 124.54, 124.40, 124.40, 124.39, 124.27, 123.97, 119.19, 39.86, 39.82, 26.90, 26.83, 26.80, 26.79, 26.63, 26.14, 25.85, 17.83, 16.57, 16.17, 16.16, 16.15, 16.13, 12.83.

melting point=55° C.

Example 17 Protection of Hydroxyl Group with a Benzyl Group—Compound (11b)

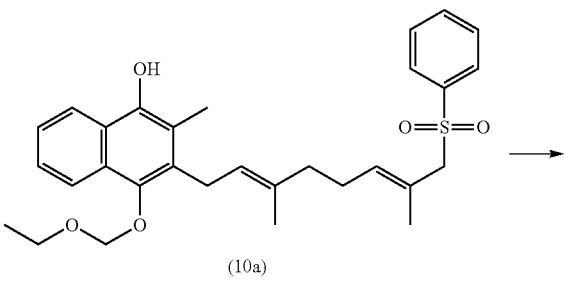

(10a)

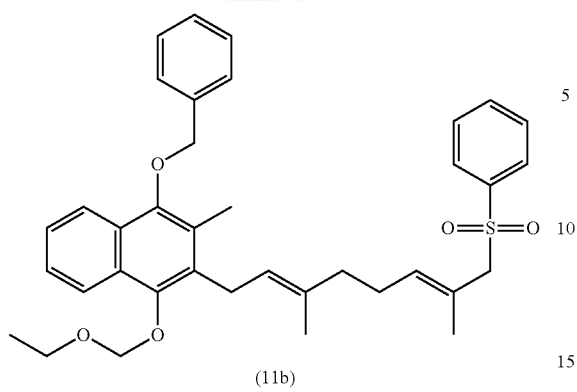

(11b)

30 ml of DCM, 3 g of compound (10a) (1 eq), 1.8 ml of benzyl bromide (2.5 eq) and 2.1 ml of diisopropylamine (DIPEA) (2 eq) were added to a flask. It was refluxed overnight (18 h). Then, it was cooled, water was added, and it was extracted. Organic layer was rinsed with water, brine, and concentrated in vacuo. 2.8 g of oil was obtained. Yield 86%.

$^1$H NMR (600 MHz, CDCl$_3$) δ 8.08; (dd, 2H), 7.81-7.76; (m, 2H), 7.58-7.53 (m, 3H), 7.49-7.41; (m, 6H), 7.42-7.35; (m, 1H), 5.14; (s, 2H), 5.02-4.96; (m, 2H), 4.95; (s, 2H), 3.93; (q, 2H), 3.65; (s, 2H), 3.59-3.55; (m, 2H), 2.33; (s, 3H), 2.02; (q, 2H), 1.83; (t, 2H), 1.74; (d, 3H), 1.73; (d, 3H), 1.30 (t, 3H). $^{13}$C NMR (151 MHz, CDCl$_3$) δ 149.24, 147.37, 138.52, 137.72, 135.91, 134.89, 133.58, 131.24, 128.98, 128.73, 128.60, 128.18, 128.02, 127.89, 127.73, 127.34, 125.77, 125.60, 123.59, 123.52, 122.73, 122.20, 99.12, 75.69, 66.31, 66.03, 38.69, 26.96, 26.88, 16.83, 16.43, 15.41, 12.98.

Example 18 Biellmann Coupling—Compound (18b)

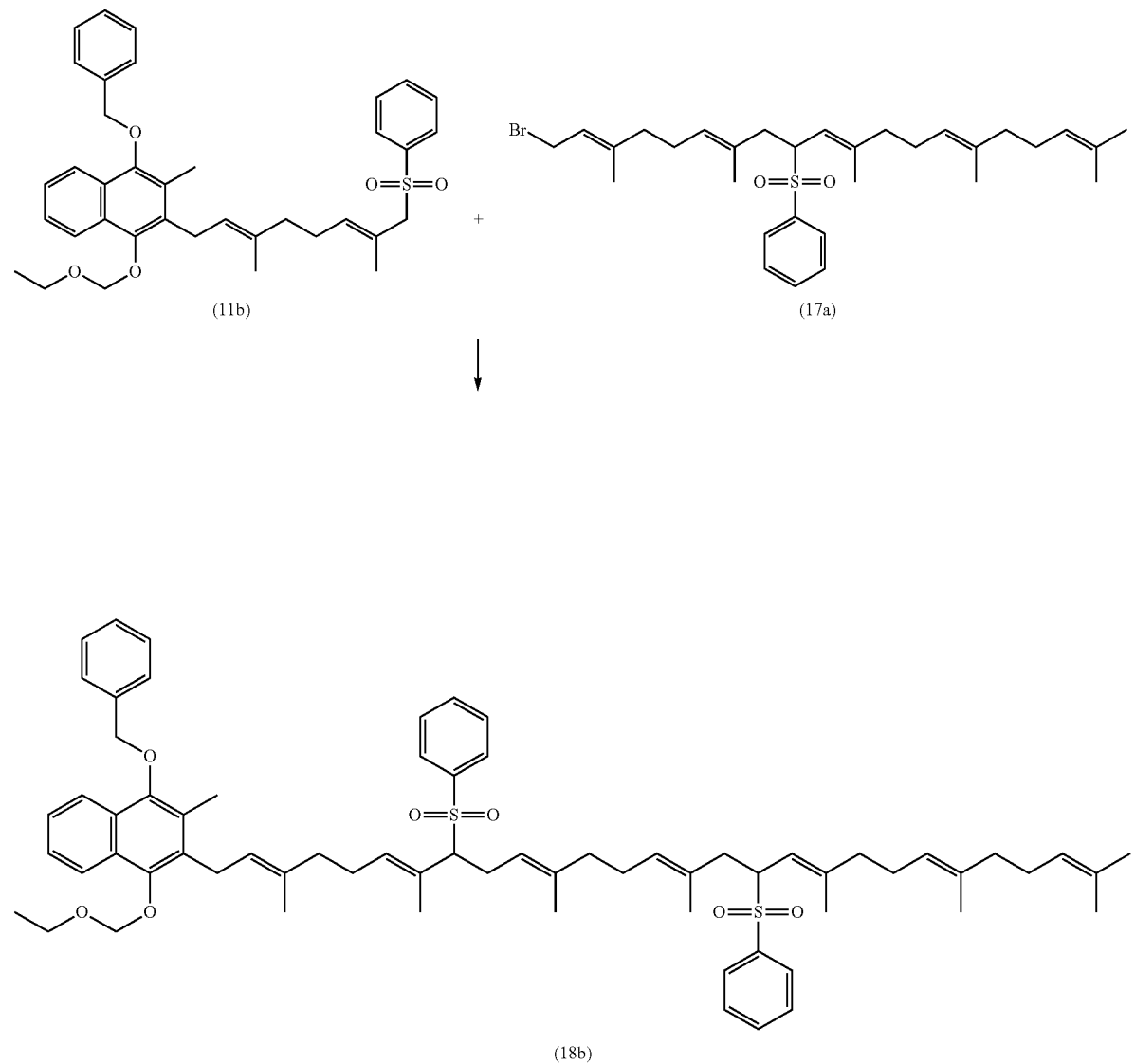

3 g of sulfone (11b) (1 eq), 3.3 g of bromide (17a) (1.2 eq) in 10 ml of THF were added to a flask. Next, the mixture was cooled to −30° C. and 6.3 ml of 1M NaHMDS (Sodium hexamethyldisilazide) solution in THF was added dropwise. After an hour, the reaction was quenched with water. The mixture was extracted with ethyl acetate. Organic phases were rinsed with water, brine, and concentrated. 5.1 g of an orange oil was obtained, which the oil was subjected to desulfonylation without further purification.

$^1$H NMR (600 MHz, DMSO-d6) δ 8.02; (dd, 2H), 7.81-7.76; (m, 2H), 7.74-7.71; (m, 2H), 7.71-7.67; (m, 1H), 7.66; (t, 1H), 7.60-7.47; (m, 8H), 7.44; (t, 2H), 7.39; (t, 1H), 5.09; (s, 2H), 5.04; (s, 1H), 4.99; (q, 2H), 4.97-4.91; (m, 2H), 4.89 (s, 2H), 4.78; (t, 1H), 4.71; (d, 1H), 4.06; (td, 1H), 3.83; (q, 2H), 3.64 (dd, 1H), 3.51; (d, 2H), 2.60; (d, 1H), 2.53-2.51; (m, 1H), 2.45-2.36; (m, 1H), 2.29; (s, 3H), 2.10; (t, 1H), 1.99-1.72; (m, 16H), 1.68; (s, 3H), 1.59; (s, 3H), 1.52; (s, 3H), 1.51; (s, 3H), 1.47; (d, 3H), 1.43; (s, 3H), 1.40; (s, 3H), 1.18; (t, 3H), 1.06; (s, 3H).

Example 19 Desuflonylation—Compound (19b)

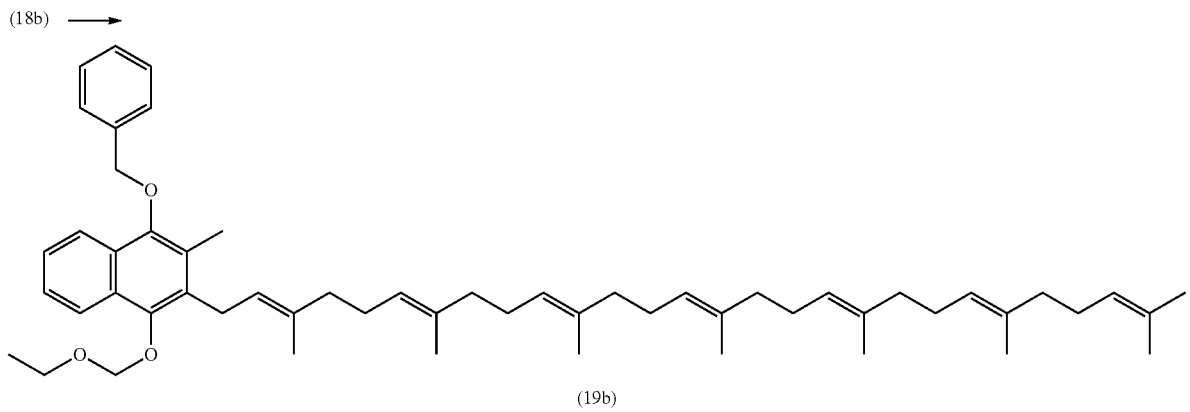 [SMILES: CCOCOc1c(C/C=C(\C)CC/C=C(\C)CC/C=C(\C)CC/C=C(\C)CC/C=C(\C)CC/C=C(\C)CCC=C(C)C)c(C)c(OCc2ccccc2)c2ccccc12]

2.9 g of compound (18b) (1 eq) in 10 ml of THF was added to a reactor. The solution was cooled to around 0° C., and 8 ml of 1M superhydride (lithium triethylborohydride) (3 eq) solution in THF was added dropwise. Next, 0.1 g of palladium catalyst Pd(dppe)Cl$_2$ was added. It was stirred for 2 h at 0° C., and then the reaction was quenched with water. The mixture was extracted with cyclohexane. Organic layers were rinsed with water, brine, and concentrated in vacuo. The resulting oil was subjected to silica gel chromatography and the residue was filtered through a pad of silica gel using a mixture of cyclohexane:toluene 1:1 (v:v) as eluent. Evaporation to dryness gave 1.57 g of a yellow oil. Yield 73%.

$^1$H NMR (600 MHz, CDCl$_3$) δ 8.09; (ddd, 2H), 7.57; (d, 2H), 7.48-7.41; (m, 4H), 7.41-7.35; (m, 1H), 5.16; (s, 2H), 5.15-5.05; (m, 7H), 4.96; (s, 2H), 3.95; (q, 2H), 3.61; (d, 2H), 2.38; (d, 3H), 2.13-1.90; (m, 24H), 1.82; (d, 3H), 1.69; (d, 3H), 1.61-1.58; (m, 15H), 1.57; (d, 3H), 1.31; (t, 3H).

Example 20 Oxidation—Compound (20)

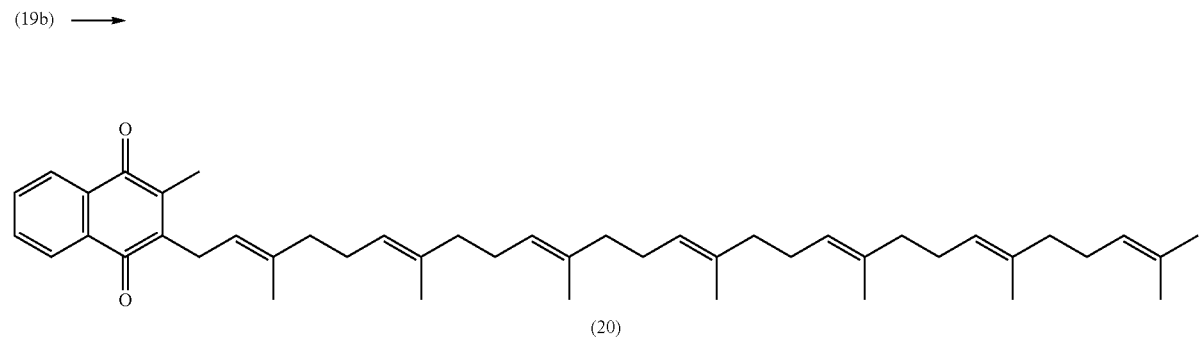

600 mg of substrate (19b) in ethyl acetate, 865 mg of CAN dissolved in water were added to a flask. It was vigorously stirred for 4 minutes at 25° C. Next, additional amount of ethyl acetate was added, and it was extracted twice with water, and rinsed with brine. After drying with sodium sulfate, it was filtered through a pad of silica gel and concentrated. 340 mg of crystallizing oil was obtained. Yield 70%.

NMR analysis conforms to the NMR spectrum of a compound (20) of Example 16. Retention time of a peak of the product as analyzed by HPLC conforms with retention time of a peak of the product of Example 16.

Example 21 Protection of the Hydroxyl Group with an Alkyl Group—Compound (9c)

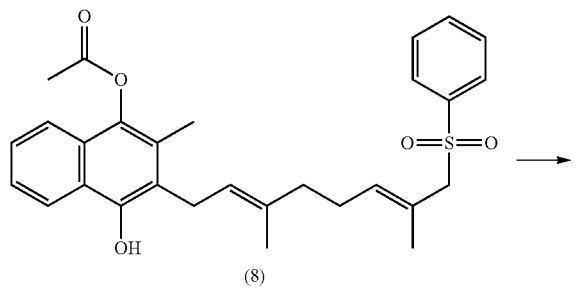

(8)

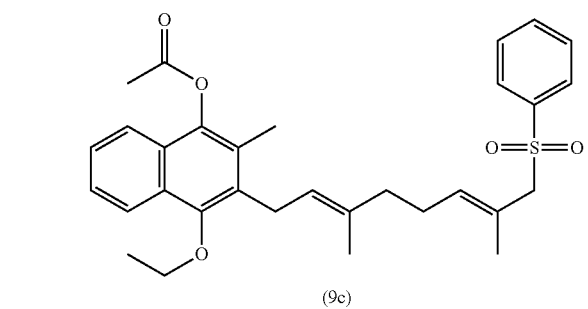

(9c)

4.1 g of substrate (8) in 30 ml of acetone was added to a flask. Next, 2.3 g of potassium carbonate, and 2.3 ml of diethyl sulfate were added. It was stirred for 20 h at 25° C. Potassium carbonate was filtered, and the filtrate was concentrated. 15 ml of DCM, 15 ml of 5% aqueous solution of NaOH were added, and it was stirred for 2 h at 25° C. Next, layers were separated, and organic layer was rinsed several times with water, and brine. Organic layer was concentrated to give 4.1 g of an oil. Yield 94%.

$^1$H NMR (500 MHz, CDCl$_3$) δ 8.07-8.00; (m, 1H), 7.81-7.76; (m, 2H), 7.72-7.65; (m, 1H), 7.60-7.53; (m, 1H), 7.49-7.40; (m, 4H), 5.01-4.92; (m, 2H), 3.98; (q, 2H), 3.65 (s, 2H), 3.56-3.51; (m, 2H), 2.48; (s, 3H), 2.19; (s, 3H), 2.01; (q, 2H), 1.82; (t, 2H), 1.73; (dd, 6H), 1.52; (t, 3H), $^{13}$C NMR (126 MHz, CDCl$_3$) δ 169.42, 150.68, 140.92, 138.43, 135.84, 135.00, 133.58, 130.40, 128.95, 128.61, 127.50, 127.16, 126.62, 126.26, 125.68, 123.55, 123.36, 122.58, 121.16, 70.73, 66.29, 38.65, 26.82, 26.49, 20.79, 16.81, 16.36, 16.04, 13.24.

Example 22 Hydrolysis—Compound (10c)

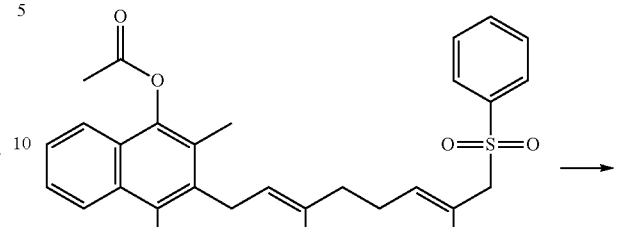

(9c)

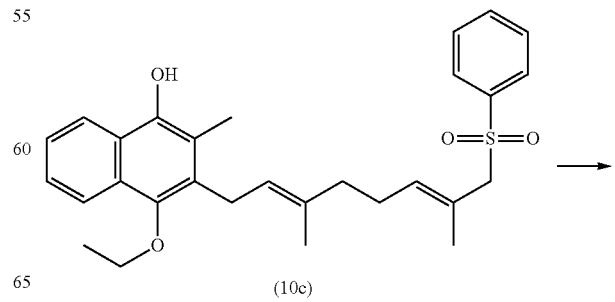

(10c)

1 g of compound (9c) (1 eq), 5 ml of methanol, and 0.1 g of sodium hydrosulfite (0.3 eq) were added to a flask. Next, the solution was cooled in an ice bath, and a solution of 0.15 g NaOH in 0.5 ml water was added. It was stirred at around 0° C. for 2 h, then ammonium chloride was added, and phases were separated. Organic layer was rinsed several times with water and brine. After evaporation 0.9 g of yellowish oil was obtained. Yield 89%.

$^1$H NMR (600 MHz, CDCl$_3$) δ 8.09-8.04; (m, 1H), 8.04-7.97; (m, 1H), 7.78; (dd, 2H), 7.55; (tt, 1H), 7.44; (dddd, 4H), 4.98; (td, 2H), 3.94; (q, 2H), 3.64; (s, 2H), 3.53; (d, 2H), 2.28; (s, 3H), 2.02; (q, 2H), 1.83; (t, 2H), 1.79-1.74; (m, 3H), 1.71; (s, 3H), 1.50; (t, 3H), $^{13}$C NMR (151 MHz, CDCl$_3$) δ 146.39, 145.22, 138.49, 135.96, 134.70, 133.60, 130.41, 128.98, 128.55, 127.25, 125.51, 125.05, 124.19, 123.85, 123.39, 122.21, 121.30, 117.50, 70.57, 66.30, 38.65, 26.82, 26.52, 16.84, 16.39, 16.00, 12.31.

Example 23 Protection of Hydroxyl Group—Compound (11c)

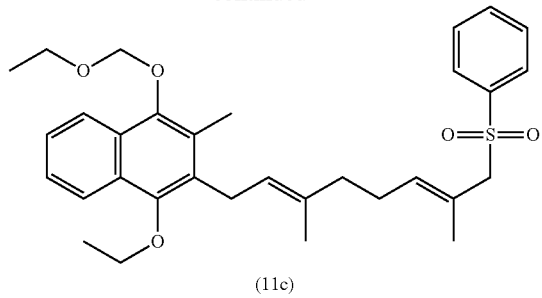

3.8 g of substrate (10c) in 40 ml of DCM was added to a flask. The mixture was cooled to 0° C., and 1.4 ml of chloromethylethyl ether, and 2.8 ml of diisopropylethylamine were added. It was stirred for 24 h at 0° C. Next, a solution of ammonium chloride was added, layers were separated, and organic layer was rinsed several times with water and brine. Evaporation to dryness gave 3.5 g of the product. Yield 82%.

$^1$H NMR (500 MHz, DMSO-d6) δ 8.04-7.94; (m, 2H), 7.80-7.74; (m, 2H), 7.64; (t, 1H), 7.54; (t, 2H), 7.48; (dq, 2H), 5.08; (s, 2H), 4.97; (q, 2H), 3.89; (q, 2H), 3.86; (s, 2H), 3.84; (q, 2H), 3.48; (d, 2H), 2.31; (s, 3H), 1.95; (q, 2H), 1.75; (t, 2H), 1.71; (s, 3H), 1.63; (s, 3H), 1.44; (t, 3H), 1.17; (t, 3H). $^{13}$C NMR (126 MHz, DSMO-d6) δ 148.47, 147.17, 138.34, 134.74, 134.62, 133.44, 130.29, 128.92, 127.99, 127.46, 127.01, 126.87, 125.50, 125.40, 123.50, 122.79, 122.14, 121.90, 98.07, 70.07, 65.02, 64.61, 38.10, 26.23, 25.97, 16.23, 15.93, 15.62, 15.05, 12.93.

Example 24 Biellmann Coupling—Compound (18c)

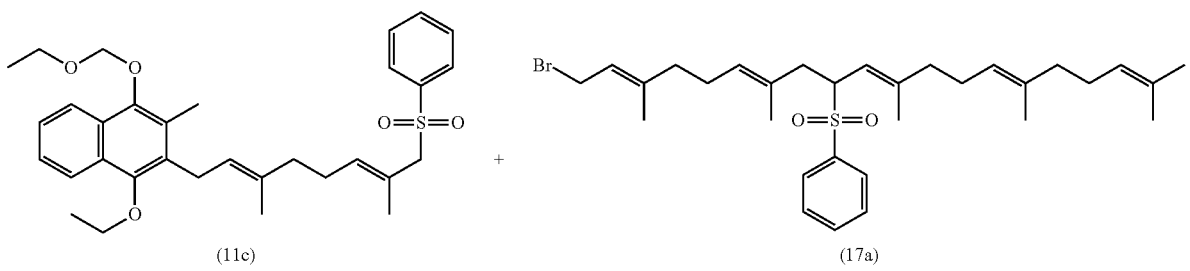

↓

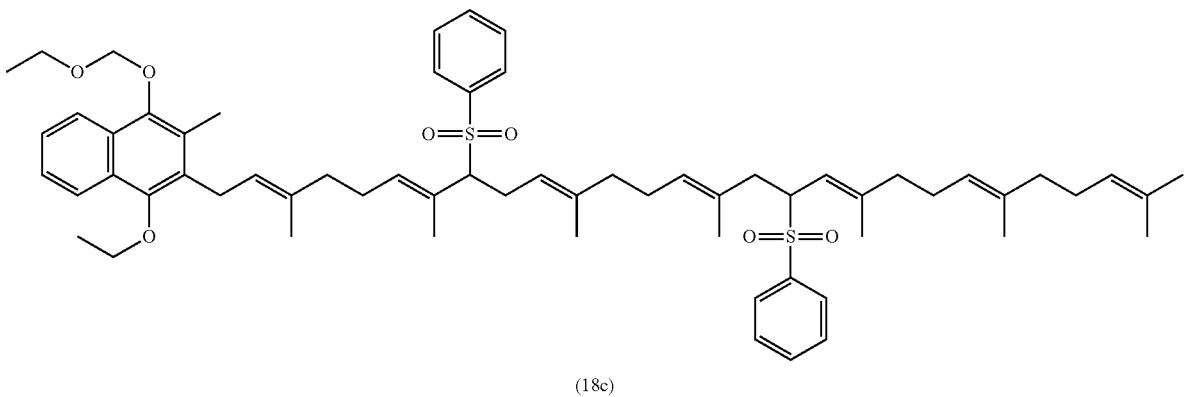

1.3 g of compound (11c), 10 ml of THF, and 1.6 g of bromide (17a) (1.2 eq) were added to a flask. The mixture was cooled to −15° C., and 3 ml of 1M LiHMDS was added dropwise. It was stirred for an hour at −15° C. The reaction was quenched with water. It was heated to 25° C. and extracted with ethyl acetate. Organic layer was rinsed with water and brine. Evaporation to dryness gave 2.3 g of an oil. The whole amount of the product was directed to desulfonylation.

$^1$H NMR (600 MHz, DMSO-d6) δ 8.01-7.96; (m, 1H), 7.95; (dd, 1H), 7.82-7.77; (m, 2H), 7.76-7.70; (m, 2H), 7.73-7.67; (m, 1H), 7.66; (t, 1H), 7.61-7.55; (m, 2H), 7.54; (t, 2H), 7.51-7.45; (m, 2H), 5.08; (s, 2H), 5.01; (dt, 3H), 4.97-4.90; (in, 2H), 4.78; (s, 1H), 4.72; (d, 1H), 4.06; (td, 1H), 3.89; (q, 2H), 3.84; (q, 2H), 3.63; (dd, 1H), 3.47; (d, 2H), 2.61; (d, 1H), 2.54-2.51; (m, 1H), 2.44-2.36; (m, 1H), 2.30; (s, 3H), 2.11; (t, 1H), 2.01-1.73; (m, 16H), 1.69; (s, 3H), 1.59; (s, 3H), 1.51; (s, 6H), 1.49-1.47; (m, 3H), 1.45-1.38; (m, 9H), 1.17; (t, 3H), 1.07; (s, 3H).

Example 25 Desulfonylation—Compound (19c)

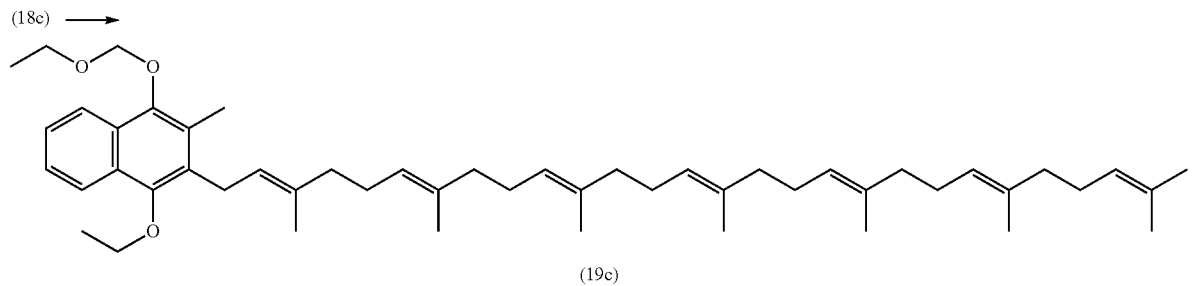 [SMILES: CCOCOc1c(C)c(C/C=C(\C)CC/C=C(\C)CC/C=C(\C)CC/C=C(\C)CC/C=C(\C)CC/C=C(\C)CCC=C(C)C)c(OCC)c2ccccc12]

1.2 g of compound (18c) (1 eq) in 10 ml of THF was added to a reactor. The solution was cooled to around 0° C., and 3.5 ml of 1M superhydride (lithium triethylborohydride) (3 eq) solution in THF was added dropwise. Next, 0.1 g of palladium catalyst Pd(dppe)Cl$_2$ (0.15 eq) was added. It was stirred for 2 h at 0° C., next the reaction was quenched with water. The mixture was extracted with cyclohexane. Organic layers were rinsed with water, brine, and concentrated in vacuo. The resulting oil was subjected to silica gel chromatography using a mixture of cyclohexane:toluene 1:1 (v/v) as eluent. Evaporation to dryness gave 0.66 g of a yellow oil. Yield 76%.

$^1$H NMR (600 MHz, CDCl$_3$) δ 8.03; (ddt, 2H), 7.47-7.39; (m, 2H), 5.14; (s, 214), 5.15-5.05; (m, 7H), 3.98; (d, 2H), 3.94; (d, 2H), 3.59-3.54; (m, 2H), 2.39; (s, 3H), 2.12-1.88; (m, 24H), 1.82; (d, 3H), 1.70-1.63; (m, 3H), 1.62-1.56; (m, 18H), 1.52; (t, 3H), 1.30; (td, 3H).

Example 26 Oxidation—Compound (20)

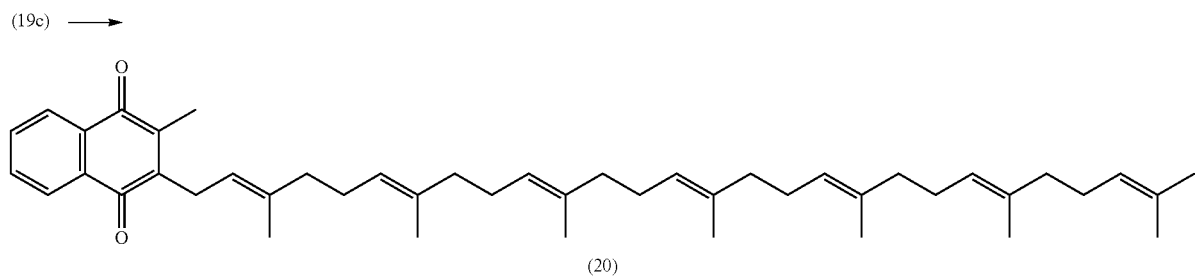

525 mg of substrate (19c) in ethyl acetate, and 825 mg of CAN dissolved in water were added to a flask. It was vigorously stirred for 5 minutes at 25° C. Next, additional amount of ethyl acetate was added, extracted twice with water, and rinsed with brine. After drying with sodium sulfate, it was filtered through a pad of silica gel and concentrated. 350 mg of crystallizing oil was obtained. Yield 76%.

NMR analysis of the product conforms to the NMR spectrum of a compound (20) of Example 16. Retention time of a peak of the product as analyzed by HPLC conforms with retention time of a peak of the product of Example 16.

The invention claimed is:

1. A method for preparation of a menaquinone of formula (20)

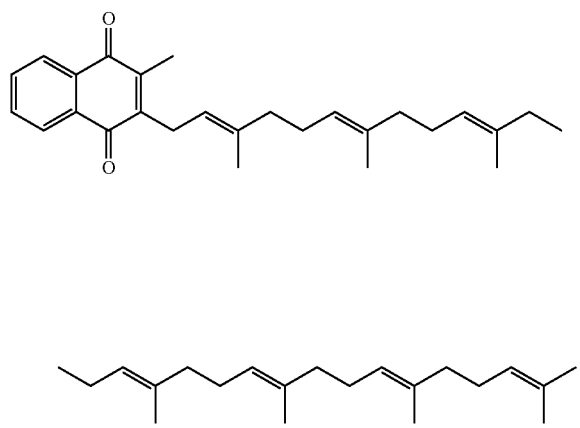

(20)

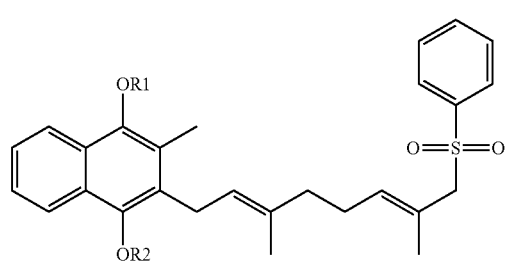

characterized in that, the method comprises coupling a compound of formula (11)

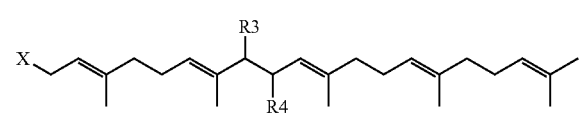

(11)

with a compound of formula (17)

(17)

in the presence of a base, to obtain a compound of formula (18)

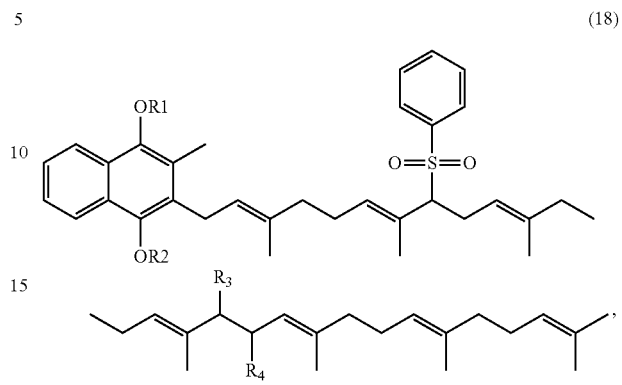

(18)

which is subjected to desulfonylation reaction in the presence of a palladium catalyst, to obtain a compound of formula (19)

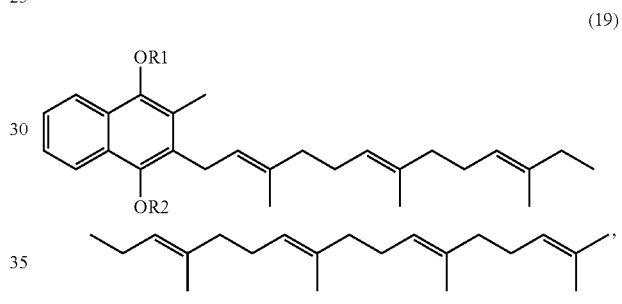

(19)

which is subjected to oxidation reaction, to obtain the menaquinone of formula (20), wherein R1 and R2 are independently selected from the group consisting of —C1-6-alkyl, —(CH2)n-O—C1-6-alkyl and benzyl, and wherein n is 1 or 2, wherein X is selected from the group consisting of Br, Cl, and I, wherein both R3 and R4 are hydrogen, or one from R3 and R4 is hydrogen and the second is phenylsulfonyl group.

2. The method according to claim 1, characterized in that, R1 and R2 are independently selected from the group consisting of CH3, —CH2-CH3, —CH2-O—CH3, —CH2-O—CH2-CH3, —CH2-CH2-O—CH3, —CH2-CH2-O—CH2-CH3 or benzyl, X is Br, R3 is hydrogen, and R4 is phenylsulfonyl group.

3. The method according to claim 1, wherein coupling reaction of a compound of formula (11) with a compound of formula (17) is performed in tetrahydrofuran as an organic solvent, in the presence of sodium N,N-bis(trimethylsilyl)amide (NaHMDS) or lithium N,N-bis(trimethylsilyl)amide (LIHMDS) as a base, and at the temperature below 0° C., preferably below −30° C.

4. The method according to claim 1, wherein desulfonylation reaction of a compound of formula (18) is performed in tetrahydrofuran, in the presence of Pd(dppe)Cl2 as a palladium catalyst, using lithium triethylborohydride, at the temperature below 20° C., preferably at 0° C.

5. The method according to claim 1, wherein the oxidation reaction of a compound of formula (19) is performed using cerium ammonium nitrate.

6. The method according to claim 5, wherein in the oxidation reaction of a compound of formula (19) a mixture of ethyl acetate and water as a solvent.

7. The method according to claim 1, wherein compound (8) is reacted to obtain compound (11)

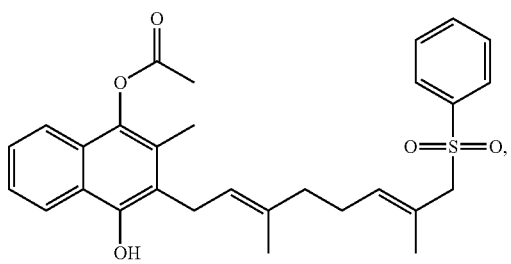

wherein compound (8) is obtained in Friedel-Crafts reaction of a compound of formula (3)

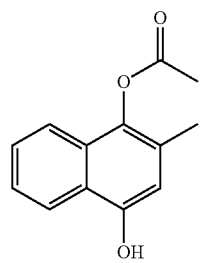

with a compound of formula (7)

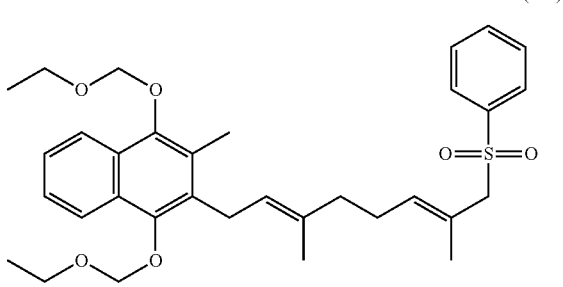

8. The method according to claim 7, wherein said Friedel-Crafts reaction is performed in the presence of boron trifluoride etherate, in a solvent being a mixture of chloroform and toluene, at the temperature of 0° C. to 40° C.

9. A compound of formula (8)

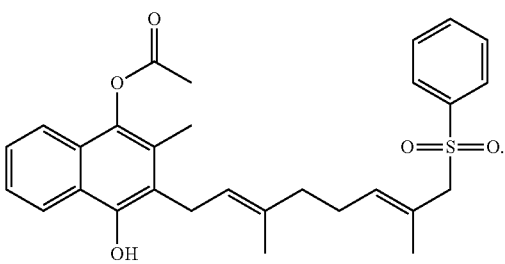

10. The compound according to claim 9 in a crystalline form, having characteristic peaks in X-ray powder diffraction (XRPD) spectrum recorded using X-ray Cu lamp at the following diffraction angles 2-theta: 17.47, 18.18, 21.56±0.2°.

11. A compound of formula (11)

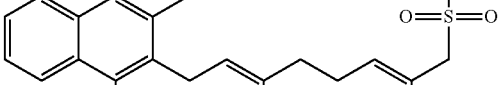

wherein R1 and R2 are independently selected from the group consisting of —C1-6-alkyl, —(CH2)n-O—C1-6-alkyl or benzyl, and wherein n is 1 or 2.

12. The compound according to claim 11, wherein for R1 being —C1-6-alkyl, —(CH2)n-O—C1-6-alkyl or benzyl, R2 is —(CH2)n-O—C1-6-alkyl, wherein for R2 being —C1-6-alkyl, —(CH2)n-O—C1-6-alkyl or benzyl, R1 is —(CH2)n-O—C1-6-alkyl.

13. The compound according to claim 11, wherein the compound of formula (11) is selected from a group consisting of compounds of formula

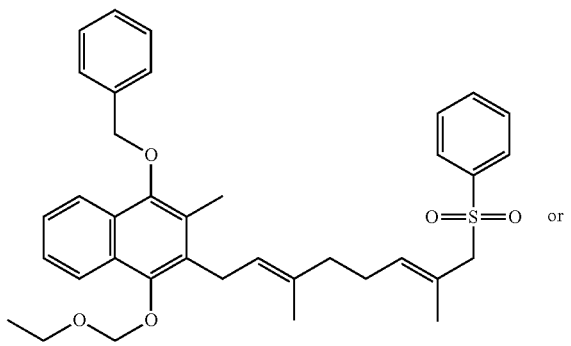

(11b)

or

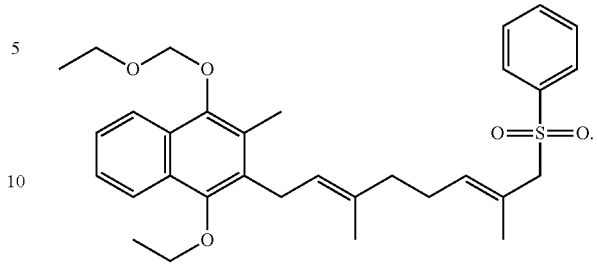

(11c)

14. A compound of formula (19)

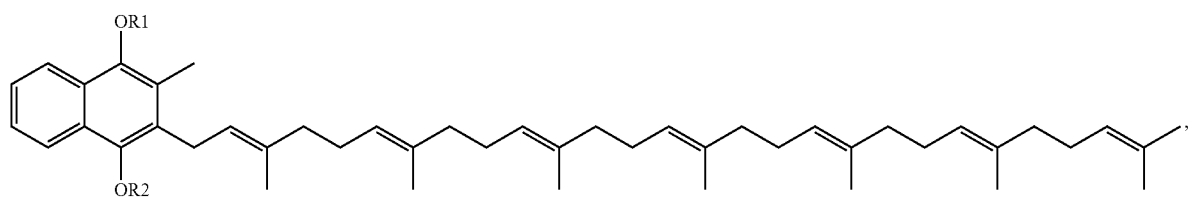

(19)

wherein R1 and R2 are independently selected from the group consisting of —C1-6-alkyl, —(CH2)n-O—C1-6-alkyl or benzyl, wherein n is 1 or 2, wherein for R1 selected from the group consisting of —C1-6-alkyl, —(CH2)n-O—C1-6-alkyl and benzyl, R2 is —(CH2)n-O—C1-6-alkyl, wherein for R2 selected from the group consisting of —C1-6-alkyl, —(CH2)n-O—C1-6-alkyl and benzyl, R1 is —(CH2)n-O—C1-6-alkyl.

15. The compound according to claim 14, wherein the compound of formula (19) is selected from a group consisting of compounds of formula

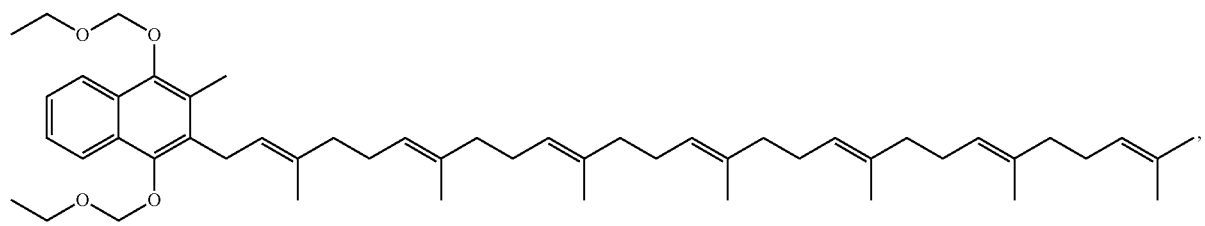

(19a)

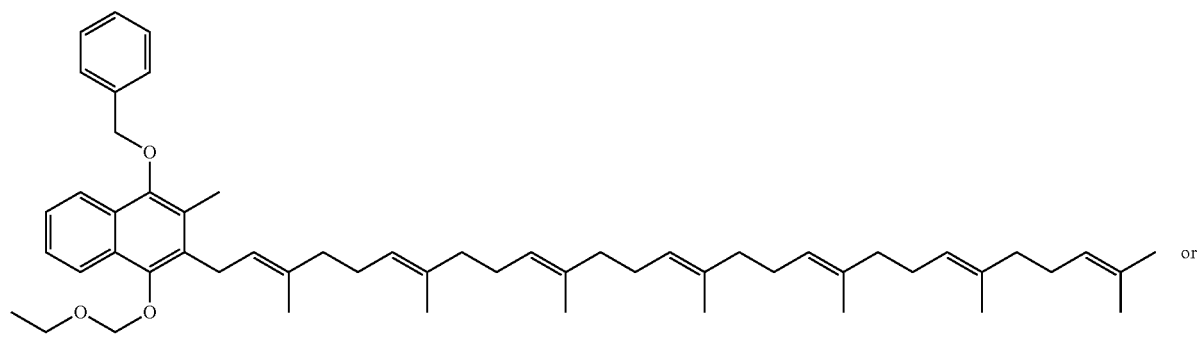

(19b)

or (19c)
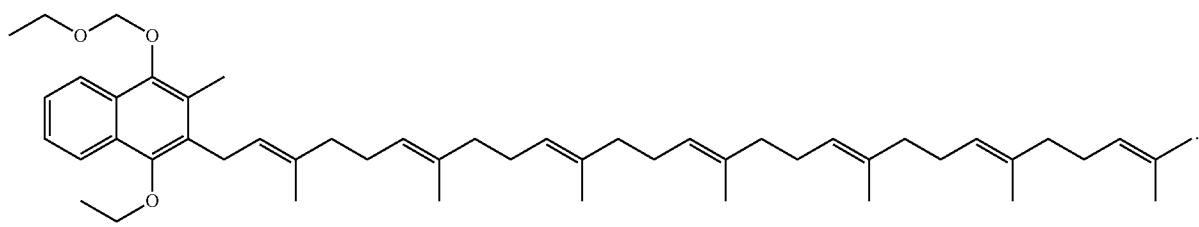
* * * * *